United States Patent [19]

vor der Brück et al.

[11] 4,060,521

[45] Nov. 29, 1977

[54] BENZENE-AZO-INDOLE DYESTUFFS

[75] Inventors: Dieter vor der Brück, Cologne; Richard Sommer; Gerhard Wolfrum, both of Leverkusen, all of Germany

[73] Assignee: Bayer Aktiengesellschaft, Leverkusen, Germany

[21] Appl. No.: 587,656

[22] Filed: June 17, 1975

[30] Foreign Application Priority Data

June 26, 1974 Germany .............................. 2430682

[51] Int. Cl.[2] ....................... C09B 29/36; C09B 43/18; D06P 1/06; D06P 3/24

[52] U.S. Cl. .................................... 260/165; 260/156; 260/326.12 R; 260/326.13 R; 260/326.13 A; 260/326.16

[58] Field of Search ................................ 260/165, 156

[56] References Cited

U.S. PATENT DOCUMENTS

| | | | |
|---|---|---|---|
| B 327,109 | 1/1975 | Wolfrum et al. | 260/165 |
| 3,255,173 | 6/1966 | Dehnert et al. | 260/153 |
| 3,891,619 | 6/1975 | Sommer et al. | 260/165 |

*Primary Examiner*—Floyd D. Higel
*Attorney, Agent, or Firm*—Plumley and Tyner

[57] ABSTRACT

Dyestuffs which in form of the free acid correspond to the formula

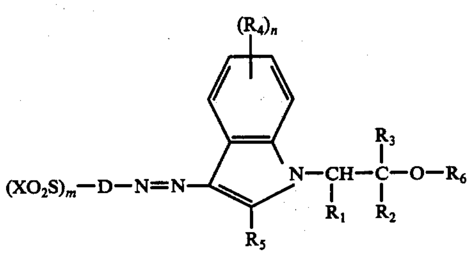

wherein

D represents the radical of an aromatic-carbocyclic diazo component, X represents OH, $-NH-SO_2-R_7$, $-N(R_8)-$alkylene$-OSO_3H$, $-N(R_8)-$alkylene$-SO_3H$, $-N(R_8)-$arylene$-SO_3H$, $-N(R_8)-$arylene$-CH_2-SO_3H$ or $-N(R_8)-$arylene$-SO_2-NH-SO_2-R_7$ $R_1$ and $R_2$ represent hydrogen, alkyl, aryl, aralkyl, cycloalkyl or carbalkoxy, but either $R_1$ or $R_2$ must be hydrogen, $R_3$ represents hydrogen or alkyl, $R_4$ represents hydrogen, halogen, cyano, alkyl, alkoxy or a sulpho group, $R_5$ represents alkyl or aryl, $R_6$ represents hydrogen, acyl or a sulpho group, $R_7$ represents alkyl, aryl or a dialkylamino group, $R_8$ represents hydrogen or alkyl, $n$ represents 1 or 2 and m represents 0, 1 or 2, with the proviso that the total number of acid groups per molecule is 1 or 2.

are suitable for the dyeing of natural and synthetic fibre materials, especially polyamide fibres.

14 Claims, No Drawings

BENZENE-AZO-INDOLE DYESTUFFS

The subject of the present invention are dyestuffs which in the form of the free acid correspond to the formula

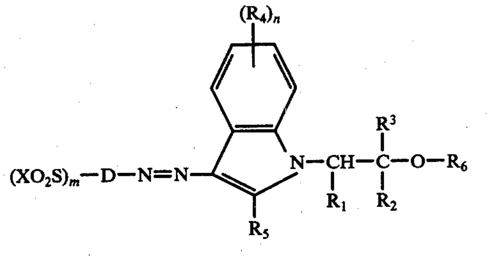

I wherein

D represents the radical of an aromatic-carbocyclic diazo component,

X represents OH,

—NH—$SO_2$—$R_7$, —N($R_8$)—alkylene—$OSO_3H$,

—N($R_8$)—alkylene—$SO_3H$, —N($R_8$)—arylene—$SO_3H$,

—N($R_8$)—arylene—$CH_2$—$SO_3H$ or —N($R_8$)—arylene—$SO_2$—NH—$SO_2$—$R_7$ $R_1$ and $R_2$ represent hydrogen, alkyl, aryl, aralkyl, cycloalkyl or carbalkoxy, but either $R_1$ or $R_2$ must be hydrogen, $R_3$ represents hydrogen or alkyl, $R_4$ represents hydrogen, halogen, cyano, alkyl, alkoxy or a sulpho group, $R_5$ represents alkyl or aryl, $R_6$ represents hydrogen, acyl or a sulpho group, $R_7$ represents alkyl, aryl or a dialkylamino group, $R_8$ represents hydrogen or alkyl,

*n* represents 1 or 2 and

*m* represents 0, 1 or 2, with the proviso that the total number of acid groups per molecule is 1 or 2.

Suitable radicals D of aromatic-carboxyclic diazo components are those of the benzene or naphthalene series, which can be substituted by halogen, cyano, carbalkoxy, trifluoromethyl, nitro, alkyl, alkoxy, hydroxyl, thiocyanato, alkylsulphonyl, arylsulphonyl or aralkylsulphonyl radicals, carbamoyl radicals or sulphamoyl radicals. The carbamoyl and sulphamoyl radicals can be monosubstituted or disubstituted by alkyl, aralkyl, aryl or the radical of a heterocyclic compound, and the substituents, with inclusion of the nitrogen of the carbamyl or sulphamoyl radical and optionally with the inclusion of a further hetero-atom can be cyclised to form a five-membered or six-membered heterocyclic structure; examples of radicals of such heterocyclic structures are

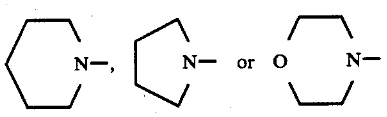

Suitable dialkylamino groups $R_7$ are, in particular, $C_1$–$C_4$-dialkylamino groups which do not carry any further substituents in the alkyl groups, for example dimethylamino, diethylamino, dipropylamino or dibutylamino.

Suitable cycloalkyl radicals $R_1$ and $R_2$, or cycloalkyl radicals present as substituents of the carbamoyl or sulphamoyl groups, are, in particular, cyclopentyl and cyclohexyl.

Examples of suitable alkyl radicals $R_1$ and $R_2$ are those with 1 to 4 carbon atoms, which can optionally be substituted by $C_1$–$C_4$-alkoxy, cyclohexyloxy, benzyloxy, phenoxy, cyano, halogen, hydroxyl or $C_1$–$C_4$-alkyl-carbonyloxy, such as methyl, ethyl, propyl, butyl, methoxymethyl, ethoxyethyl, phenoxymethyl, benzyloxymethyl, cyclohexyloxymethyl, hydroxymethyl, acetoxymethyl, propionyloxymethyl or benzoyloxymethyl.

Examples of suitable alkyl radicals $R_3$, $R_4$, $R_5$ and $R_7$ are unsubstituted $C_1$–$C_4$-alkyl radicals, for example methyl, ethyl, propyl and isobutyl.

Suitable alkyl radicals $R_8$ present on D, on the alkylsulphonyl groups and as substituents of the carbamoyl and sulphamoyl radicals are, for example, those with 1–4 C atoms, which can optionally be substituted by halogen, cyano, hydroxyl or $C_1$–$C_4$-alkoxy, for example methyl, ethyl, propyl, methoxymethyl, hydroxyethyl, cyanoethyl and chloroethyl.

Suitable aryl radicals $R_1$, $R_2$, $R_5$ and $R_7$ present as substituents of the carbamoyl and sulphamoyl groups and of the arylsulphonyl groups are, in particular, phenyl or naphthyl radicals which are optionally substituted further by phenyl, $C_1$–$C_4$-alkyl, halogen, $NO_2$ or $C_1$–$C_4$-alkoxy, for example phenyl, 1-naphthyl, 2-naphthyl, p-biphenyl, 4-chlorophenyl, 2,4-dichlorophenyl, 4-ethoxyphenyl, o-, m- and p-tolyl, 4-nitrophenyl or 4-ethylphenyl.

Suitable aralkyl groups $R_1$ and $R_2$ present as substituents of the sulphamoyl or carbamyl groups or of the aralkylsulphonyl groups are, in particular, benzyl or 2-phenylethyl groups. The phenyl radical of these groups can optionally be substituted further by $C_1$–$C_4$-alkyl, $C_1$–$C_4$-alkoxy, halogen, or cyano, as, for example, benzyl, 2-phenylethyl, p-methylbenzyl, p-methoxybenzyl, 2,4-dichlorobenzyl, 4-cyanobenzyl and p-bromophenylethyl.

Suitable carbalkoxy groups $R_1$ or $R_2$, and carbalkoxy groups present on D, are in particular carbo-$C_1$–$C_4$-alkoxy, such as carboethoxy, carboisopropoxy and carbomethoxy.

Suitable halogen atoms are fluorine, chlorine and bromine, especially chlorine and bromine.

Suitable alkoxy radicals $R_4$, or alkoxy radicals present as substituents of D, are, in particular, $C_1$–$C_4$-alkoxy, which can optionally be substituted by OH, halogen or cyano, such as, for example, methoxy, ethoxy, propoxy, butoxy, 2-hydroxy-ethoxy, 2-cyano-ethoxy or 2-chloroethoxy.

Suitable alkylene radicals in

—N(R$_8$)—alkylene—O—SO$_3$H or —N(R$_8$)—alkylene—SO$_3$H are, in particular, $C_2$-$C_4$-alkylene radicals, for example -$CH_2$-$CH_2$,

—CH(CH$_3$)—CH$_2$—CH$_2$—CH$_2$—CH$_2$—, —CH(CH$_3$)—CH$_2$—CH$_2$—,

—CH$_2$—CH(CH$_3$)—CH$_2$—, —CH$_2$—CH$_2$—CH(CH$_3$)— or -$CH_2$-$CH_2$-$CH_2$-$CH_2$-.

Suitable arylene radicals in

—N(R$_8$)—arylene—SO$_2$—NH—SO$_2$—R$_7$,

—N(R$_8$)—arylene—SO$_3$H or —N(R$_8$)—arylene—CH$_2$(SO$_3$H)

are, in particular, 1,2-, 1,3- or 1,4-phenylene radicals.

The phenylene radicals can be substituted further, for example by alkyl, especially $C_1$-$C_4$-alkyl, by alkoxy, especially $C_1$-$C_4$-alkoxy, such as $CH_3$—O— or $C_2H_5$—O—, or by aralkoxy such as $C_6H_5$-$CH_2$—O—, or by chlorine, bromine, cyano or nitro.

A suitable heterocyclic structure present as the substituent of a sulphamoyl or carbamoyl radical is, for example, the 2-sulpholanyl radical.

Suitable acyl radicals $R_6$ are, in particular, $C_2$-$C_4$-alkylcarbonyl, $C_1$-$C_4$-alkoxycarbonyl, arylcarbonyl, aryloxycarbonyl, $C_1$-$C_4$-alkylsulphonyl, arylsulphonyl, $C_1$-$C_4$-alkylaminocarbonyl and arylaminocarbonyl. The aryl groups of the radicals mentioned can be phenyl radicals which are optionally substituted further by $C_1$-$C_4$-alkyl, halogen or $C_1$-$C_4$-alkoxy. The following may be mentioned as examples of acyl radicals $R_6$: acetyl, propionyl, methoxycarbonyl, ethoxycarbonyl, butoxycarbonyl, phenoxycarbonyl, p-chlorophenoxycarbonyl, methylsulphonyl, ethylsulphonyl, p-methylphenylsulphonyl, 2,5-dimethylphenylsulphonyl, 2-methyl-5-chlorophenylsulphonyl, methylaminocarbonyl, phenylaminocarbonyl and 4-chlorophenylaminocarbonyl.

Preferred dyestuffs are those which in the form of the free acid correspond to the formula

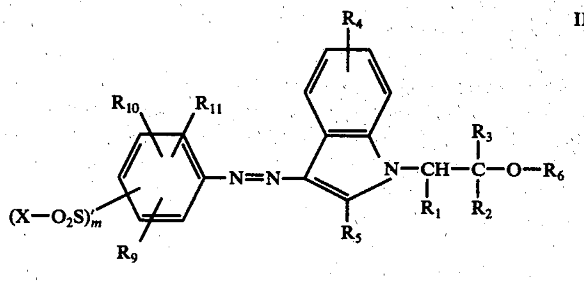

II wherein $R_1$, $R_2$, $R_3$, $R_4$, $R_5$, $R_6$ and X have the abovementioned meaning, $R_9$ and $R_{10}$ represent hydrogen, chlorine, bromine, thiocyanato, cyano, nitro, $C_1$-$C_4$-alkyl, $C_1$-$C_4$-alkoxy, carbo-$C_1$-$C_4$-alkoxy, a carbamoyl or sulphamoyl radical, hydroxyl or trifluoromethyl or a $C_1$-$C_4$-alkylsulphonyl radical, a phenylsulphonyl radical or a benzylsulphonyl radical, $R_{11}$ represents hydrogen, chlorine, bromine, $C_1$-$C_4$-alkyl, trifluoromethyl, a sulphamoyl radical or a $C_1$-$C_4$-alkylsulphonyl radical, a phenylsulphonyl radical or a benzylsulphonyl radical and $m'$ represents 0 or 1.

Particularly preferred dyestuffs are those which in the form of the free acid correspond to the formula

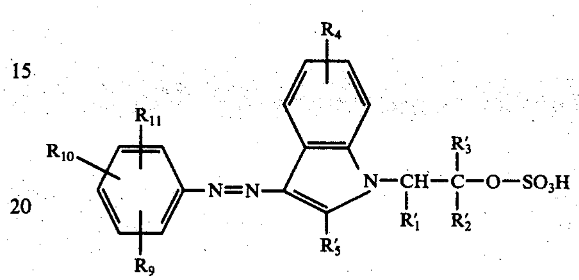

III wherein $R_9$, $R_{10}$ and $R_{11}$ have the abovementioned meaning, $R_1'$, $R_2'$ and $R_3'$ represent hydrogen or $C_1$-$C_4$-alkyl, but either $R_1'$ or $R_2'$ must be hydrogen, $R_4'$ represent hydrogen, chlorine, methyl, ethyl, methoxy or ethoxy and $R_5'$ represents unsubstituted $C_1$-$C_4$-alkyl or phenyl, especially those which in the form of the free acid correspond to the formula

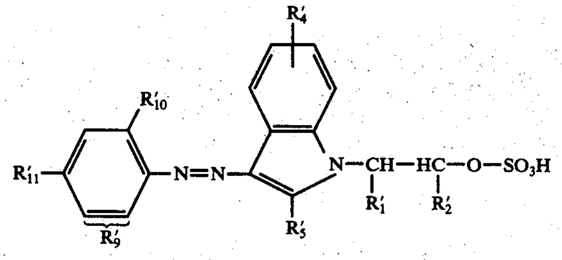

IV wherein $R_1'$, $R_2'$, $R_4'$ and $R_5'$ have the abovementioned meaning and $R_9'$ and $R_{10}'$ represent hydrogen, methyl, chlorine, bromine, trifluoromethyl, sulphamoyl, unsubstituted $C_1$-$C_4$-alkylsulphonyl, benzylsulphonyl or phenylsulphonyl and $R_{11}'$ represents hydrogen, chlorine, bromine, trifluoromethyl, sulphamoyl, unsubstituted $C_1$-$C_4$-alkylsulphonyl, benzylsulphonyl or phenylsulphonyl.

Very particularly preferred dyestuffs are those which in the form of the free acid correspond to the formula

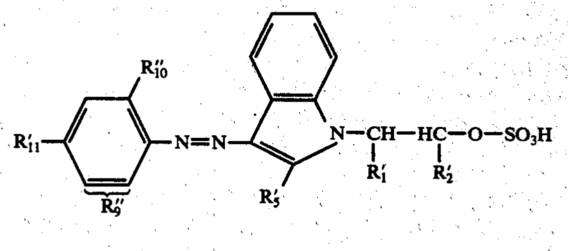

V wherein $R_1'$, $R_2'$, $R_5'$ and $R_{11}'$ have the abovementioned meaning and $R_9''$ represents hydrogen, chlorine, bromine or trifluoromethyl, sulphamoyl or $C_1$–$C_4$-alkylsulphonyl and $R_{10}''$ represents chlorine, bromine, methyl or trifluoromethyl.

Further particularly preferred dyestuffs are those which in the form of the free acid correspond to the formula

VI

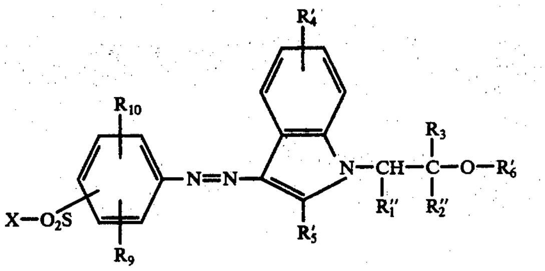

wherein $R_3$, $R_4'$, $R_5'$, $R_9$, $R_{10}$ and X have the abovementioned meaning and $R_1''$ and $R_2''$ represent hydrogen, optionally phenoxysubstituted $C_1$–$C_4$-alkyl, phenyl or o-, m- or p-tolyl, but either $R_1''$ or $R_2''$ must be hydrogen and $R_6'$ represents hydrogen, $C_2$–$C_4$-alkylcarbonyl, $C_1$–$C_4$-alkoxycarbonyl, phenylcarbonyl or phenoxycarbonyl, especially those which in the form of the free acid correspond to the formula

VII

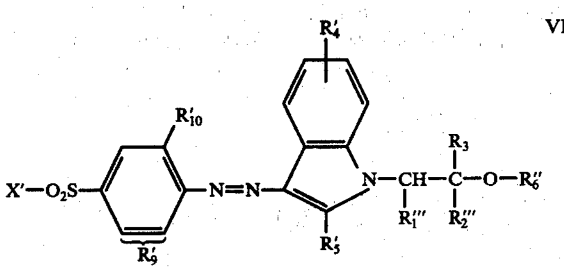

wherein $R_3'$, $R_4'$, $R_5'$, $R_9'$ and $R_{10}'$ have the abovementioned meaning and X' represents OH, —NH—$SO_2$—$R_7'$, —N($R_8'$)—alkylene—O—$SO_3H$, —N($R_8'$)—alkylene—$SO_3H$ or —N($R_8'$)—phenylene—$SO_3H$, $R_1'''$ and $R_2'''$ represent hydrogen, optionally phenoxysubstituted $C_1$–$C_4$-alkyl or phenyl, but either $R_1'''$ or $R_2'''$ must be hydrogen, $R_6''$ represents hydrogen, $R_7'$ represents unsubstituted $C_1$–$C_4$-alkyl, phenyl substituted by methyl, ethyl, chlorine or bromine, or 1- or 2-naphthyl and $R_8'$ represents hydrogen or unsubstituted $C_1$–$C_4$-alkyl.

Very particularly preferred dyestuffs within the scope of the formula VII are those which in the form of the free acid correspond to the formula

VIII

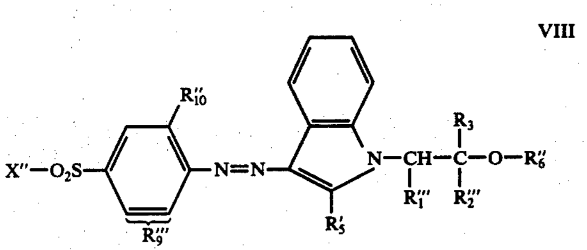

wherein $R_1'''$, $R_2'''$, $R_3$, $R_5'$, $R_6''$ and $R_{10}''$ have the above-mentioned meaning and X'' represents OH, —NH—$SO_2$—$R_7''$, —N($R_8''$)—alkylene—O—$SO_3H$, —N($R_8''$)—alkylene—$SO_3H$ or —N($R_8''$)—phenylene—$SO_3H$ and $R_7''$ represents unsubstituted $C_1$–$C_4$-alkyl, o-, m- or p-tolyl or o-, m- or p-chloro- or bromo-phenyl, $R_8''$ represents hydrogen, methyl or ethyl and $R_9'''$ represents hydrogen, chlorine, bromine or trifluoromethyl.

Further particularly preferred compounds within the scope of the formula I are those which in the form of the free acid correspond to the formula

IX

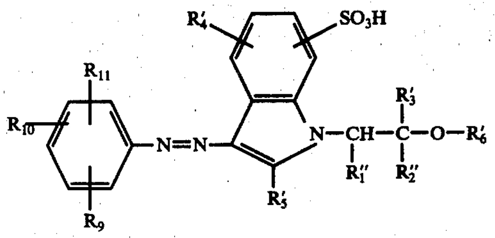

wherein $R_1''$, $R_2''$, $R_3'$, $R_4'$, $R_5'$, $R_6'$, $R_9$, $R_{10}$ and $R_{11}$ have the abovementioned meaning, especially those which in the form of the free acid correspond to the formula

X

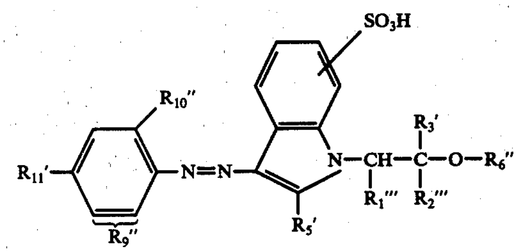

wherein $R_1'''$, $R_2'''$, $R_3'$, $R_5'$, $R_6''$, $R_9''$, $R_{10}''$ and $R_{11}'$ have the abovementioned meaning.

The dyestuffs of the formula (I) are obtained by coupling a diazotised amine of the formula $$(X—O_2S)_m—D—NH_2 \qquad XI$$

wherein

D, X and $m$ have the abovementioned meaning with an idole of the formula

XII

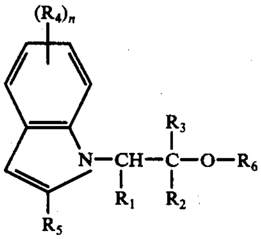

wherein $R_1$, $R_2$, $R_3$, $R_4$, $R_5$, $R_6$ and $n$ have the abovementioned meaning.

Dyestuffs of the formula

XIII

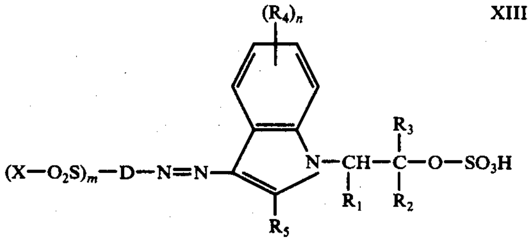

wherein $R_1$, $R_3$, $R_4$, $R_5$, X, $m$ and $n$ have the abovementioned meaning, can furthermore be obtained from dyestuffs of the formula

XIV

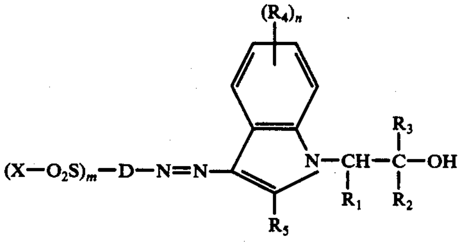

by esterification with sulphuric acid or oleum.

Dyestuffs of the formula XIV can also be obtained by addition reaction of epoxides of the formula

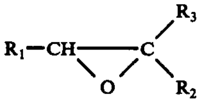

wherein $R_1$, $R_2$ and $R_3$ have the abovementioned meaning with dyestuffs of the formula

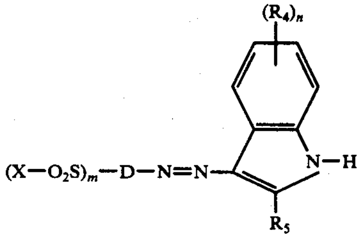

wherein

D, $R_4$, $R_5$, X, $m$ and $n$ have the abovementioned meaning, in aqueous, aqueous-organic or organic media, for example in dimethylsulphoxide.

Indoles of the formula (XV)

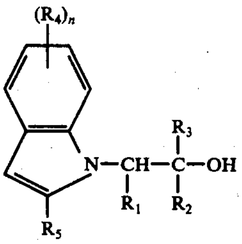

can be prepared according to methods known from the literature, by addition reaction of an epoxide of the formula (XVI)

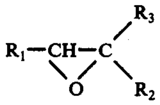

with an indole of the formula (XVII)

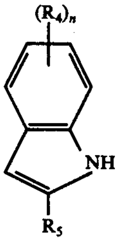

wherein $R_1$, $R_2$, $R_3$, $R_4$, $R_5$ and $n$ have the abovementioned meaning.

The isomer mixtures which may be produced in the addition reaction of unsymmetrical epoxides of the formula (XVI) with indoles of the formula (XVII) can be used direct for the preparation of dyestuffs of the formula I.

Indoles of the formula

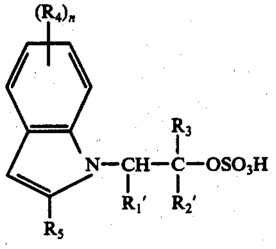

(XVIII)

wherein $R_1$, $R_2$, $R_3$, $R_4$, $R_5$ and $n$ have the abovementioned meaning are prepared by esterification of indoles of the formula (XV) with sulphuric acid or oleum.

Indoles of the formula

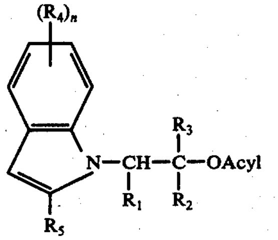

(IXX)

wherein $R_1$, $R_2$, $R_3$, $R_4$, $R_5$ and $n$ have the abovementioned meaning can be obtained by acylation of indoles of the formula (XV).

Examples of suitable indoles of the formula (XII) are: 1-(2-hydroxypropyl)-2-methylindole, 1-(2-hydroxybutyl)-2-methylindole, 1-(2-hydroxy-2-phenylethyl)-2-methylindole, 1-(2-hydroxy-2-methylpropyl)-2-methylindole, 1-(2-hydroxypentyl)-2-methylindole, 1-(2-hydroxy-3-phenoxypropyl)-2-methylindole, 1-(2-hydroxy-3-allyloxypropyl)-2-methylindole, 1-(1-hydroxybutyl-2)-2-methylindole, 1-(1-hydroxypropyl-2)-2-methylindole, 1-(1-hydroxpentyl-2)-2-methylindole, 1-(2-acetoxypropyl)-2-methylindole, 1-(2-acetoxybutyl)-2-methylindole, 1-(2-ethoxycarbonyloxybutyl)-2-methylindole, 1-(2-sulphatopropyl)-2-methylindole, 1-(2-sulphatobutyl)-2-methylindole, 1-(2-sulphato-2-methylpropyl)-2-methylindole, 1-(2-hydroxypropyl)-2-phenylindole, 1-(2-hydroxybutyl)-2-phenylindole, 1-(2-hydroxy-2-phenylethyl)-2-phenylindole, 1-(2-hydroxy-2-methylpropyl)-2-phenylindole, 1-(2-hydroxypentyl)-2-phenylindole, 1-(2-hydroxy-3′-phenoxypropyl)-2-phenylindole, 1-(2-hydroxy-3′-allyloxypropyl)-2-phenylindole, 1-(1-hydroxybutyl-2)-2-phenylindole, 1-(1-hydroxypropyl-2)-2-phenylindole, 1-(1-hydroxypentyl-2)-2-phenylindole, 1-(2-acetoxypropyl)-2-phenylindole, 1-(2-acetoxybutyl)-2-phenylindole, 1-(2-ethoxycarbonyloxybutyl)-2-phenylindole, 1-(2-sulphatopropyl)-2-phenylindole, 1-(2-sulphatobutyl)-2-phenylindole, 1-(2sulphato-2-methylpropyl)-2-phenylindole, 1-(2-hydroxypropyl)-2-methylindole-sulphonic acid, 1-(2-hydroxybutyl)-2-methylindole-sulphonic acid, 1-(2-hydroxy-2-phenylethyl)-2-methylindole-sulphonic acid, 1-(2-hydroxy-2-methylpropyl)-2-methylindole-sulphonic acid, 1-(2-hydroxypentyl)-2-methylindole-sulphonic acid, 1-(2-hydroxy-3-phenoxypropyl)-2-methylindole-sulphonic acid, 1-(2-hydroxy-3-allyloxypropyl)-2-methylindole-sulphonic acid, 1-(1-hydroxybutyl-2)-2-methylindole-sulphonic acid, 1-(1-hydroxypropyl-2)-2-methylindole-sulphonic acid, 1-(1-hydroxypentyl-2)-2-methylindole-sulphonic acid, 1-(2-acetoxypropyl)-2-methylindole-sulphonic acid, 1-(2-acetoxybutyl)-2-methylindole-sulphonic acid, 1-(2-ethoxycarbonyloxybutyl)-2-methylindole-sulphonic acid, 1-(2-hydroxypropyl)-2-phenylindole-sulphonic acid, 1-(2-hydroxybutyl)-2-phenylindole-sulphonic acid, 1-(2-hydroxy-2-phenylethyl)-2-phenylindole-sulphonic acid, 1-(2-hydroxy-2-methylpropyl)-2-phenylindole-sulphonic acid, 1-(2-hydroxypentyl)-2-phenylindole-sulphonic acid, 1-(2-hydroxy-3-phenoxypropyl)-2-phenylindole-sulphonic acid, 1-(2-hydroxy-3-allyloxypropyl)-2-phenylindole-sulphonic acid, 1-(1-hydroxybutyl-2)-2-phenylindole-sulphonic acid, 1-(1-hydroxypropyl-2)-2-phenylindole-sulphonic acid, 1-(1-hydroxypentyl-2)-2-phenylindole-sulphonic acid, 1-(2acetoxypropyl)-2-phenylindole-sulphonic acid, 1-(2-acetoxybutyl)-2-phenylindole-sulphonic acid and 1-(2-ethoxycarbonyloxybutyl)-2-phenylindole-sulphonic acid.

Examples of suitable amines (XI) are: aniline, 2-, 3- and 4-chloroaniline, 2,5-dichloroaniline, 2,4-dichloroaniline, 3-bromoaniline, 2-bromonaniline, 2-trifluoromethylaniline, 2-, 3- and 4-toluidine, 2-, 3- and 4-anisidine, 2-ethylaniline, 4-propoxyaniline, 4-benzylsulphonylaniline, 2-chloro-4-ethylsulphonylaniline, 2,5-dichloro-4-propylsulphonylaniline, aniline-4-N,N-dimethylsulphonamide, 2-chloroaniline-4-sulphonamide, 2-trifluoromethylaniline-4-N-benzylsulphonamide, 2,5-dichloroaniline-4-sulphonanilide, 2-chloroaniline-4-(2-methyl)-sulphonanilide, 2,5-dichloroaniline-4-N-hydroxypropylsulphonamide, 2-chloroaniline-4-N-cyclohexylsulphonamide, 2-trifluoromethylaniline-4-N-methyl-N-phenylsulphonamide, 2-chloro-5-bromoaniline-4-N,N-dimethylsulphonamide, 2-chloro-6-methylaniline-4-N-methylsulphonamide, 2,5-dibromoaniline-4-N-benzylsulphonamide, aniline-4-sulphonic acid, 2-chloroaniline-4-sulphonic acid, 2,5-dichloroaniline-4-sulphonic acid, 2,5-dibromoaniline-4-sulphonic acid, 2-trifluoromethylaniline-5-sulphonic acid, 2-bromoaniline-4-sulphonic acid, 2,6-dibromoaniline-4-sulphonic acid, 2,6-dicyanoaniline-4-sulphonic acid, 2-triluoromethyl-5-chloroaniline-4-sulphonic acid, 2-methylaniline-4-sulphonic acid, 3-methylaniline-4-sulphonic acid, 3-chloroaniline-5-sulphonic acid, 2,5-dimethoxyaniline-4-sulphonic acid, 1-aminonaphthalene-4-sulphonic acid, (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3amino-4-chloro-benzenesulphonyl)-benzenesulphonamide, (3-amino-6-methyl-benzenesulphonyl)-benzenesulphonamide, (3-amino-6-methoxy-benzenesulphonyl)-butanesulphonamide, (4-amino-benzenesulphonyl)-p-toluenesulphonamide, (4-amino-benzenesulphonyl)-o-toluenesulphonamide, (4-amino-benzenesulphonyl)-methylsulphonamide, (4-amino-benzenesulphonyl)-butanesulphonamide, (4-amino-3-trifluoromethyl-benzenesulphonyl)-benzenesulphonamide, (4-amino-trifluoromethyl-benzenesulphonyl)-methanesulphonamide, (4-amino-3-trifluoromethyl-benzenesulphonyl)-butanesulphonamide, (4-amino-3-trifluoromethyl-benzenesulphonyl)-p-toluenesulphonamide, (4-amino-3-trifluoromethyl-benzenesulphonyl)-o-toluenesulphonamide, (4-amino-3-trifluoromethyl-benzenefulphonyl)-2-napthylsulphonamide, (4-amino-3-chloro-benzenesulphonyl)-benzenesulphonamide, (4-amino-3-chloro-benzenesulphonyl)-p-toluenesulphonamide, (4-amino-3- chloro-benzenesulphonyl)-methanesulphonamide, (4-amino-3-chloro-benzenesulphonyl)-dimethylaminosulphonamide, (4-amino-3-bromo-benzenesulphonyl)-benzenesulphonamide, (4-amino-3-methyl-benzenesulphonyl)-benzenesulphonamide, (4-amino-3-methyl-benzenesulphonyl)-p-toluenesulphonamide, (4-amino-2,5-dichloro-benzenesulphonyl)-benzenesulphonamide, (4-amino-2,5-dichloro-benzenesulphonyl)-propanesulphonamide, (4-amino-2,5-dichloro-benzenesulphonyl)-p-toluenesulphonamide, (4-amino-2,5-dichloro-benzenesulphonyl)-dimethylaminosulphonamide, (4-amino-3,5-dichloro-benzenesulphonyl)-benzenesulphonamide, (4-amino-2-chloro-5-trifluoromethyl-benzenesulphonyl)-benzenesulphonamide, (4-amino-2-chloro-5-trifluoromethyl-benzenesulphonyl)-methanesulphonamide, (4-amino-2-chloro-5-trifluoromethyl-benzenesulphonyl)-2-naphthylsulphonamide, (4-amino-2-trifluoromethyl-5-chloro-benzenesulphonyl)-benzenesulphonamide, (4-amino-2-trifluoromethyl-5-chloro-benzenesulphonyl)-2-naphthylsulphonamide, (4-amino-2-trifluoromethyl-5-bromobenzenesulphonyl)-butanesulphonamide, (4-amino-2-trifluoromethyl-benzenesulphonyl)-methanesulphonamide, (4-amino-2-trifluoromethyl-benzenesulphonyl)-butanesulphonamide, (4-amino-2-methyl-5-chloro-benzenesulphonyl)-p-toluenesulphonamide, (4-amino-2-methyl-5-chloro-benzenesulphonyl)-o-toluenesulphonamide, (4-amino-2,5-dibromo-benzenesulphonyl)-benzenesulphonamide, (4-amino-2,5-dimethyl-benzenesulphonyl)-butanesulphonamide, N-(4-amino-phenylsulphonyl)-2-amino-ethanesulphonic acid, N-methyl-N-(4-amino-phenylsulphonyl)-2-amino-ethanesulphonic acid, N-propyl-N-(4-amino-phenylsulphonyl)-2-amino-ethanesulphonic acid, N-(4-amino-2-chloro-phenylsulphonyl)-2-amino-ethanesulphonic acid, N-ethyl-N-(4-amino-2-chloro-phenylsulphonyl)-2-amino-ethanesulphonic acid, N-(4-amino-3-chloro-phenylsulphonyl)-2-amino-ethanesulphonic acid, N-methyl-N-(4-amino-3-chloro-phenylsulphonyl)-2-amino-ethanesulphonic acid, N-ethyl-N-(4-amino-3-chloro-phenylsulphonyl)-2-amino-ethanesulphonic acid, N-(4-amino-2,5-dichloro-phenylsulphonyl)-2-amino-ethanesulphonic acid, N-methyl-N-(4-amino-2,5-dichlorophenylsulphonyl)-2-amino-ethanesulphonic acid, N-ethyl-N-(4-amino-2,5-dichloro-phenylsulphonyl)-2-amino-ethanesulphonic acid, N-(4-amino-3,5-dichloro-phenylsulphonyl)-2-amino-ethanesulphonic acid, N-methyl-N-(4-amino-3,5-dichloro-phenylsulphonyl)-2-amino-ethanesulphonic acid, N-(4-amino-3-methyl-phenylsulphonyl)-2-amino-ethanesulphonic acid, N-(4-amino-3-methoxy-phenylsulphonyl)-2-amino-ethanesulphonic acid, N-methyl-N-(4-amino-3-methoxy-phenylsulphonyl)-2-amino-ethanesulphonic acid, N-(4-amino-3-trifluoromethyl-phenylsulphonyl)-2-amino-ethanesulphonic acid, N-methyl-N-(4-amino-3-trifluoromethyl-phenylsulphonyl)-2-amino-ethanesulphonic acid, N-propyl-N-(4-amino-3-trifluoromethyl-phenylsulphonyl)-2-amino-ethanesulphonic acid, N-(4-amino-phenylsulphonyl)-3-amino-propylsulphonic acid, N-methyl-N-(4-amino-phenylsulphonyl)-3-amino-propylsulphonic acid, N-(4-amino-2-chloro-phenylsulphonyl)-3-amino-propylsulphonic acid, N-(4-amino-2,5-dichloro-phenylsulphonyl)-3-amino-propylsulphonic acid, N-(4-amino-3,5-dichloro-phenylsulphonyl)-3-amino-propylsulphonic acid, N-propyl-N-(4-amino-3,5-dichloro-phenylsulphonyl)-3-amino-propylsulphonic acid, N-(4-amino-3-trifluoromethylphenylsulphonyl)-3-amino-propylsulphonic acid, N-methyl-N-(4-amino-2,5-dichloro-phenylsulphonyl)-3-amino-butylsulphonic acid, N-(4-amino-2,5-dichlorophenyl-sulphonyl)-3-amino-phenylsulphonic acid, N-(4-amino-3-trifluoromethyl-phenylsulphonyl)-3-amino-phenylsulphonic acid, N-(4-amino-2,5-dichloro-phenylsulphonyl)-4-amino-phenylsulphonic acid and N-methyl-N-(4-amino-2,5-dichloro-phenylsulphonyl)-4-amino-phenylsulphonic acid.

The dyestuffs according to the invention can be used for dyeing natural and synthetic fibrous materials, especially for dyeing polyamide fibres in level, yellow to orange shades of very good fastness to light, the dyeing yield being good. The dyestuffs are absorbed well on polyamide fibres even in a neutral to weakly acid dyebath. By polyamide fibres there are here especially understood fibres of synthetic polyamides such as ε-polycaprolactam or condensation products of adipic acid and hexamethylenediamine. The dyestuffs are used either in the form of the free acids or in the form of their salts, especially of the alkali metal salts, preferably of the sodium or potassium salts, or of the ammonium salts.

EXAMPLE 1

3.51 of 2,5-dichloro-4-amino-benzenesulphonic acid are dissolved in 30 ml of water by addition of 0.8 g of sodium hydroxide solution. 1 g of sodium nitrite is then also dissolved in the mixture. The solution thus obtained is added dropwise to 100 g of ice and 10 ml of concentrated hydrochloric acid. The whole is stirred for a further 2 hours at 0° C, the excess nitrite is destroyed with amidosulphonic acid and a solution of 3.04 g of 1-(2-hydroxy-2-methyl-propyl)-2-phenylindole in 75 ml of glacial acetic acid is then added dropwise. After completion of coupling, the dyestuff, which in the form of the free acid corresponds to the formula

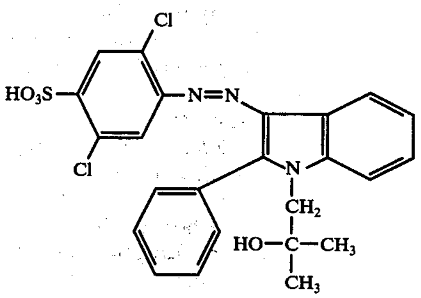

is isolated by filtration, washed with water and dried in vacuo at 40 ° to 50° C.

DYEING EXAMPLE 0.1 g of the dyestuff of Example 1 is dissolved in 100 ml of hot water, 5 ml of 10% strength ammonium acetate solution are added and the mixture is diluted to a volume of 500 ml with water. 10 g of polyamide fibres are introduced into the dyebath, the latter is brought to the boil over the course of 20 minutes, 4 ml of 10% strength acetic acid are added and the mixture is kept at the boil for 1 hour. The fibres are then rinsed and dried at 70°–80° C. A yellow dyeing which exhibits excellent fastness properties is obtained.

EXAMPLE 2

3.68 g of 2-trifluoromethyl-4-methylaminosulphonylaniline are diazotised in a mixture of 100 ml of glacial acetic acid and 10 ml of concentrated hydrochloric acid by means of an aqueous solution of 1 g of sodium nitrite at 0° C.

The diazonium salt solution thus obtained is added dropwise at 0° to 5° C, to a solution of 4.2 g of 1-(2'-sulphatobutyl)-2-methylindole in sulphuric acid. After completion of coupling, the dyestuff, which in the form of the free acid corresponds to the formula

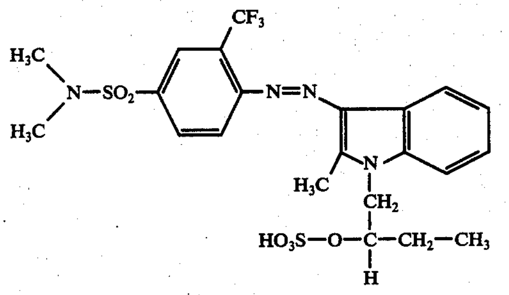

is filtered off, washed with water and dried in vacuo at 40° C.

The same dyestuff is also obtained if the dyestuff of the formula

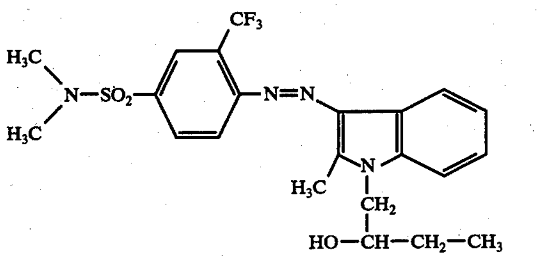

is warmed in concentrated sulphuric acid to 40° C for 3 hours. The product is isolated by pouring the mixture out onto ice and buffering to pH 2 with saturated sodium acetate solution at 0° C. The dissolved dyestuff is salted out with sodium chloride and is isolated in the usual manner. The dyestuff dyes polyamide fibres and polyamide fabrics from a weakly acid or neutral bath in yellow shades having a good level of fastness.

EXAMPLE 2*a*

An aqueous solution of 1-(2-sulphatobutyl)-2-methylindole is obtained when 1-(2-hydroxybutyl)-2-methylindole, in concentrated sulphuric acid, is warmed to 30°-40° C and the reaction mixture is then poured out onto ice. The mixture is buffered with an aqueous sodium acetate solution until a clear solution has been produced, which is employed direct for the preparation of the dyestuff.

EXAMPLE 3

4.3 g of 2,5-dichloro-4-amino-N,N-diethyl-benzene-sulphonic acid amide in 100 ml of acetic acid and 10 ml of concentrated hydrochloric acid are diazotised with an aqueous solution of 1 g of sodium nitrite at 0° C. The resulting diazonium salt solution is added dropwise at 0°-5° C to an aqueous solution of 5.2 g of 1-(2-hydroxy-2-phenylethyl)-2-methylindole-sulphonic acid. After completion of coupling, the dyestuff of the formula

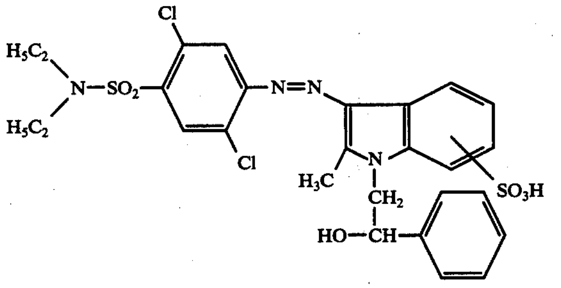

separates out. It is filtered off and rinsed with cold water. The dyestuff dyes polyamide in fast yellow shades.

EXAMPLE 3*a*

The 1-(2-hydroxy-2-phenylethyl)-2-methylindole-sulphonic acid employed as the coupling component is obtained as an aqueous solution in accordance with the following instructions: 27.3 g of 2-methylindole-sulphonic acid are dissolved in 50 ml of dimethylsulphoxide and 7.7 g of 86% strength potassium hydroxide solution are added. 18 g of styrene oxide are then added dropwise over the course of 1.5 hours. The mixture is stirred for a further 3 hours at 50° C and is poured out onto ice. The 1-(2-hydroxy-2-phenylethyl)-2-methylindole-sulphonic acid thus obtained can be employed, without isolation, for the preparation of dyestuffs.

If the procedure described in Examples 1 to 3 is followed and the compounds listed in column II of the table which follows are employed as diazo components, and the compounds listed in column I of the table which follows are employed as coupling components, valuable water-soluble dyestuffs are obtained, which dye polyamide, from a weakly acid or neutral bath, in yellow to orange shades.

| Example | Coupling component | Diazo component |
|---|---|---|
| 4 | 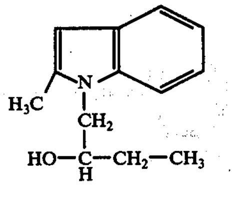 | 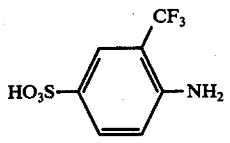 |

-continued
| Example | Coupling component | Diazo component |
|---|---|---|
| 5 | " | 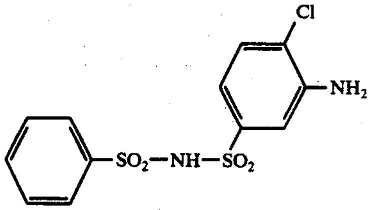 |
| 6 | " | 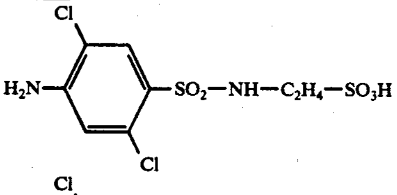 |
| 7 | " | 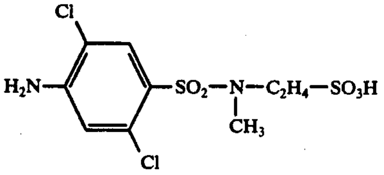 |
| 8 | " | 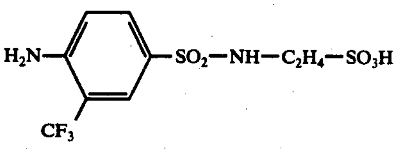 |
| 9 | " | 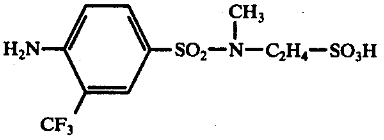 |
| 10 | " | 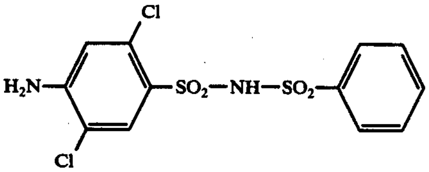 |
| 11 | 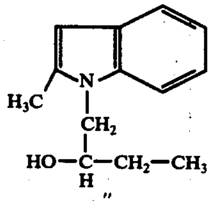 | 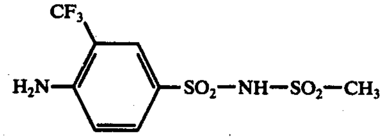 |
| 12 | " | 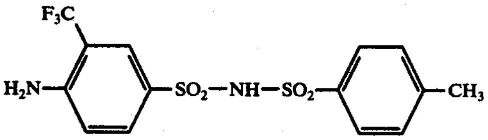 |
| 13 | 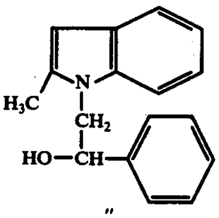 | 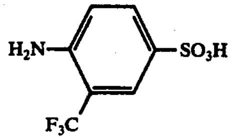 |
| 14 | " | 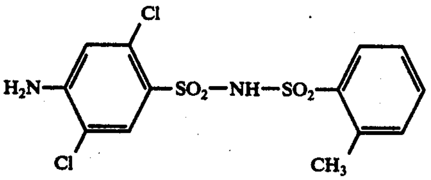 |

-continued
| Example | Coupling component | Diazo component |
|---|---|---|
| 15 | " | 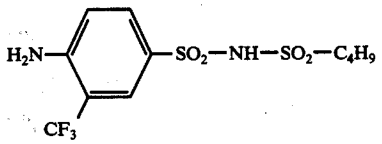 |
| 16 | " | 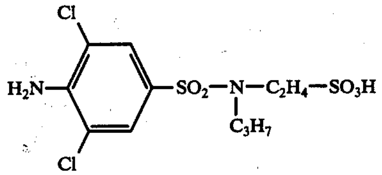 |
| 17 | 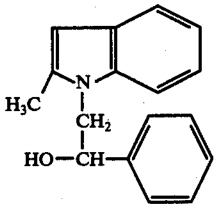 | 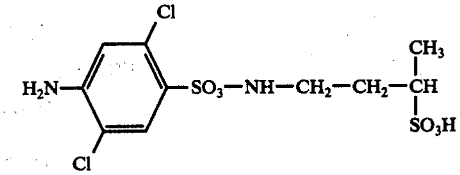 |
| 18 | 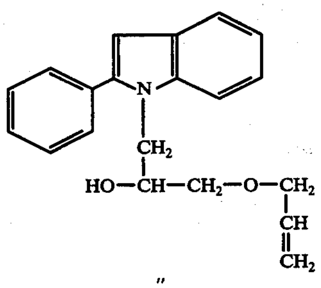 | 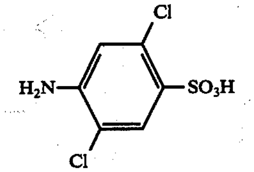 |
| 19 | " | 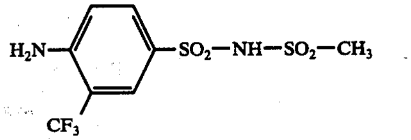 |
| 20 | " | 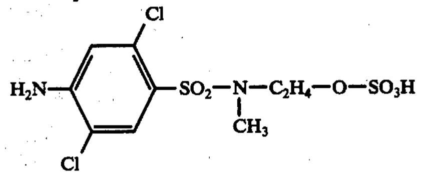 |
| 21 | " | 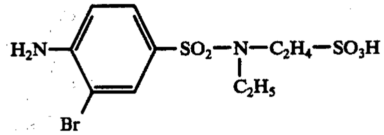 |
| 22 | 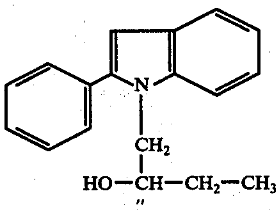 | 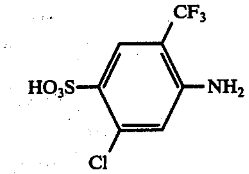 |
| 23 | " | 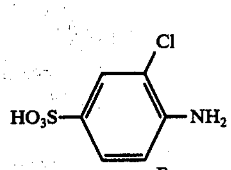 |
| 24 | " | 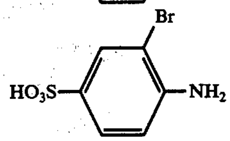 |

-continued
| Example | Coupling component | Diazo component |
|---|---|---|
| 25 | " | 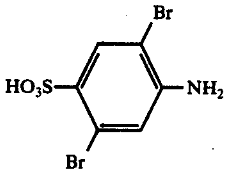 |
| 26 | " | 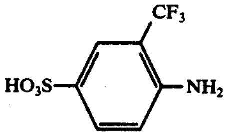 |
| 27 | " | 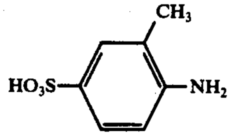 |
| 28 | " | 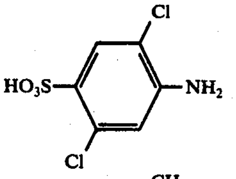 |
| 29 | 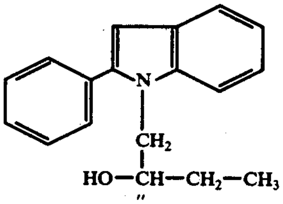 | 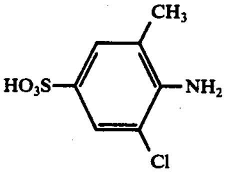 |
| 30 | " | 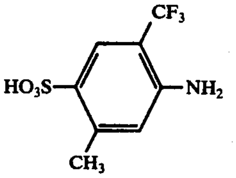 |
| 31 | " | 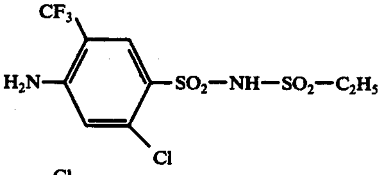 |
| 32 | " | 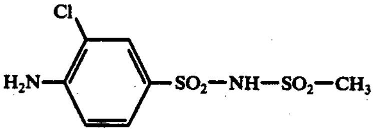 |
| 33 | " | 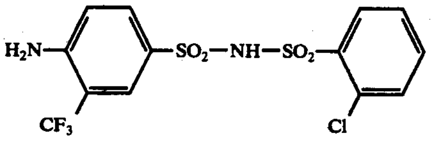 |
| 34 | " | 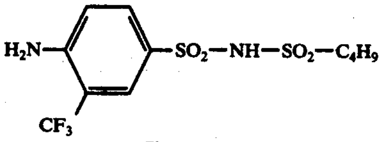 |
| 35 | " | 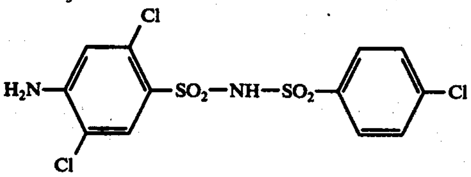 |

-continued
| Example | Coupling component | Diazo component |
|---|---|---|
| 36 | " | 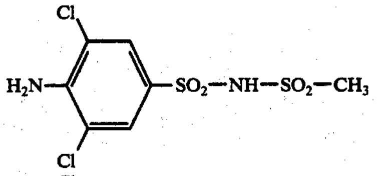 |
| 37 | " | 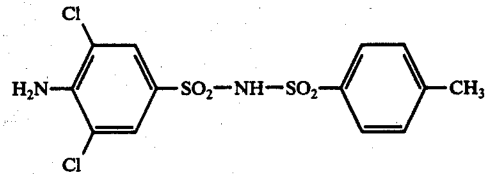 |
| 38 | " | 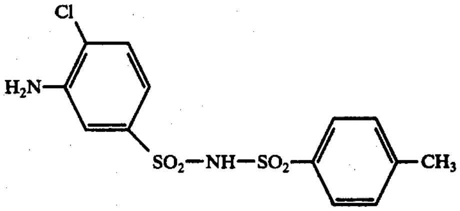 |
| 39 | " | 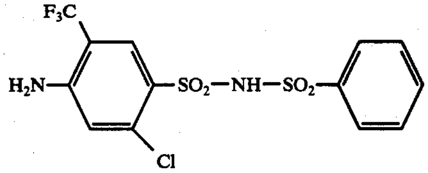 |
| 40 | " | 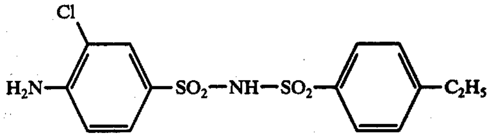 |
| 41 | " | 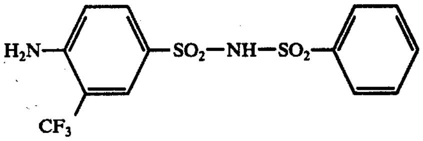 |
| 42 | " | 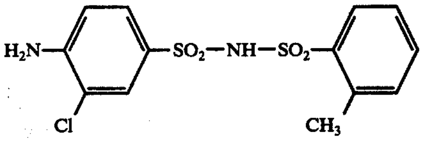 |
| 43 | 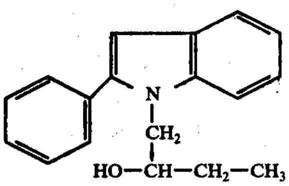 | 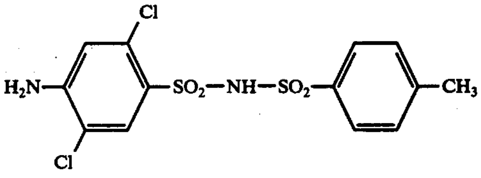 |
| 44 | " | 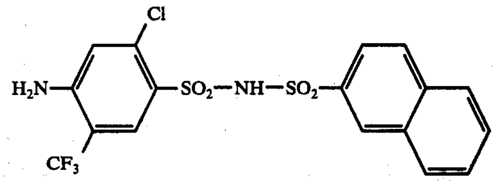 |
| 45 | 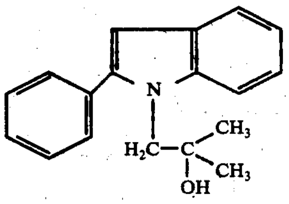 | 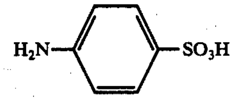 |

-continued
| Example | Coupling component | Diazo component |
|---|---|---|
| 46 | " | 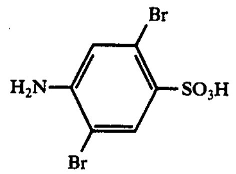 |
| 47 | " | 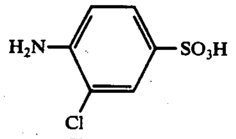 |
| 48 | " | 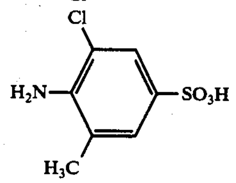 |
| 49 | 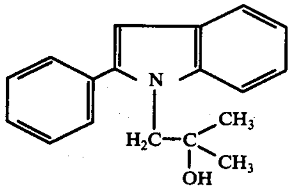 | 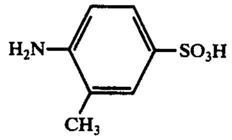 |
| 50 | " | 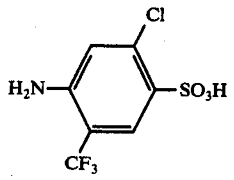 |
| 51 | " | 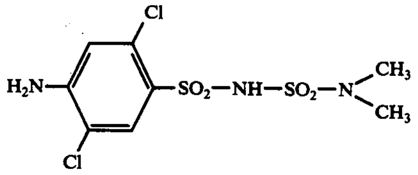 |
| 52 | " | 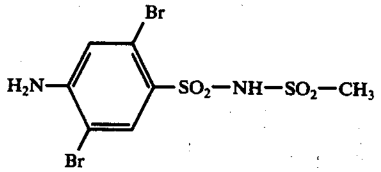 |
| 53 | " | 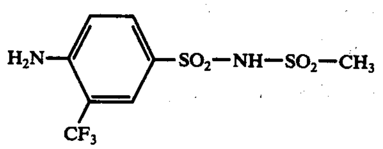 |
| 54 | 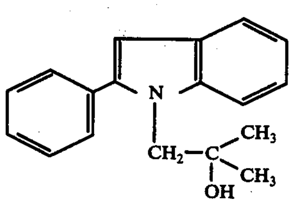 | 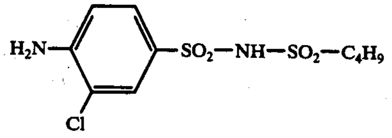 |
| 55 | " | 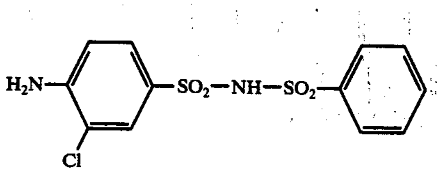 |

-continued
| Example | Coupling component | Diazo component |
|---|---|---|
| 56 | " | 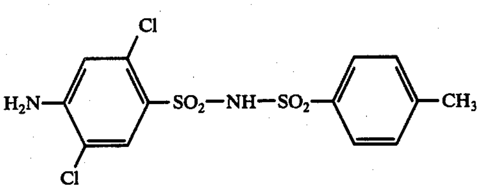 |
| 57 | " | 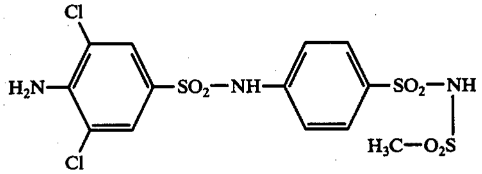 |
| 58 | " | 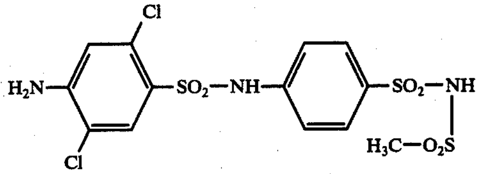 |
| 59 | " | 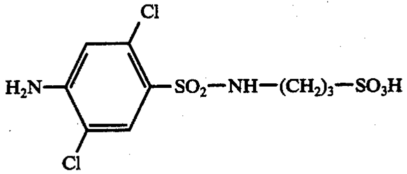 |
| 60 | " | 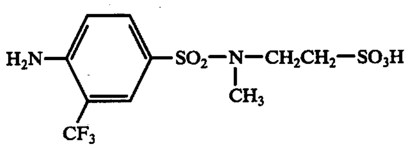 |
| 61 | 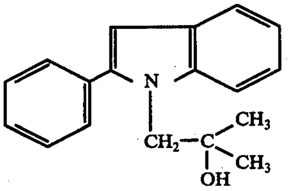 | 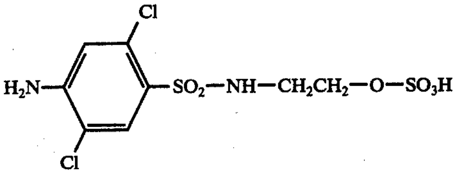 |
| 62 | " | 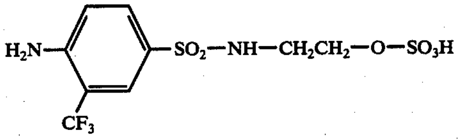 |
| 63 | 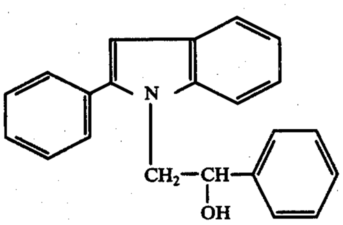 | 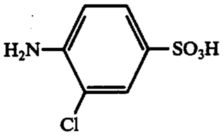 |
| 64 | " | 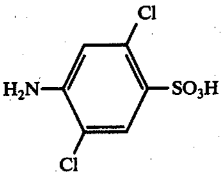 |
| 65 | " | 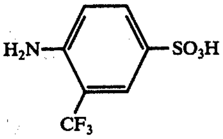 |

-continued
| Example | Coupling component | Diazo component |
|---|---|---|
| 66 | " | 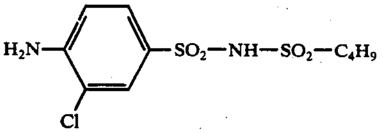 |
| 67 | " | 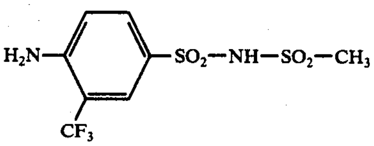 |
| 68 | 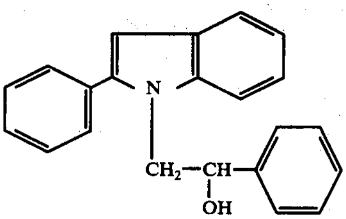 | 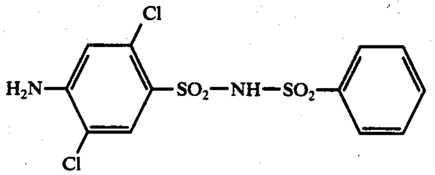 |
| 69 | " | 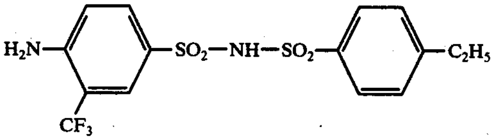 |
| 70 | " | 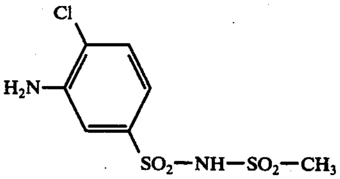 |
| 71 | " | 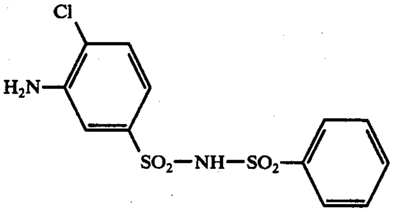 |
| 72 | " | 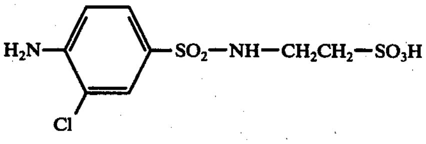 |
| 73 | " | 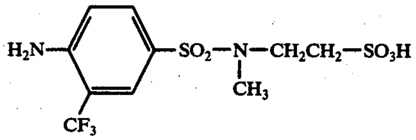 |
| 74 | 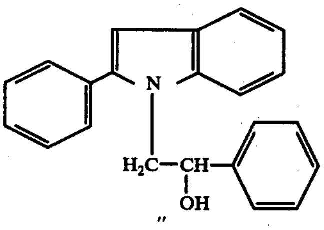 | 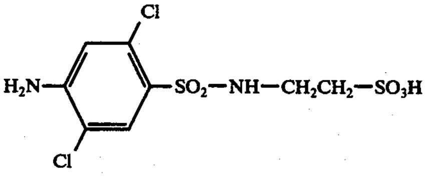 |
| 75 | " | 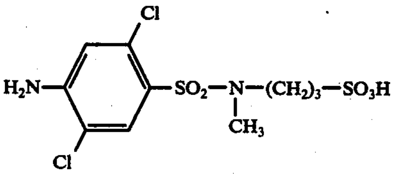 |

-continued
| Example | Coupling component | Diazo component |
|---|---|---|
| 76 | " | 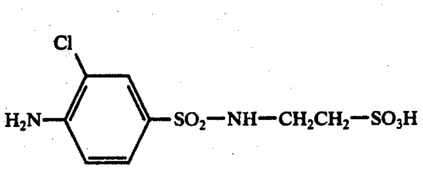 |
| 77 | " | 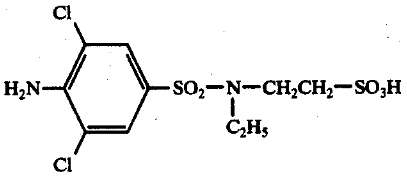 |
| 78 | 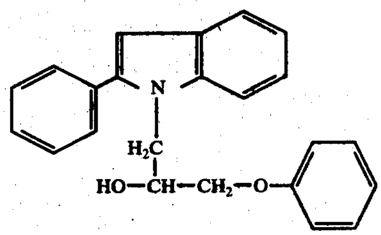 | 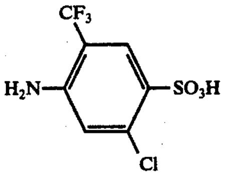 |
| 79 | " | 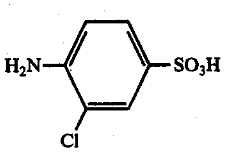 |
| 80 | " | 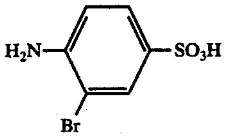 |
| 81 | " | 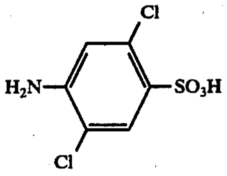 |
| 82 | " | 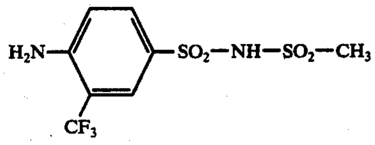 |
| 83 | " | 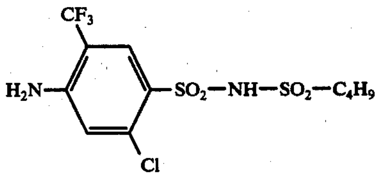 |
| 84 | " | 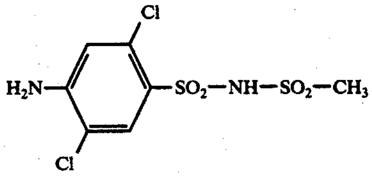 |
| 85 | " | 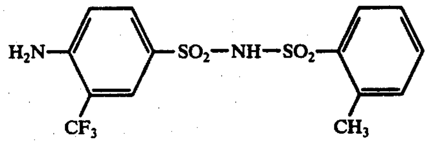 |

-continued
| Example | Coupling component | Diazo component |
|---|---|---|
| 86 | " | 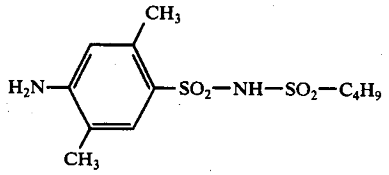 |
| 87 | " | 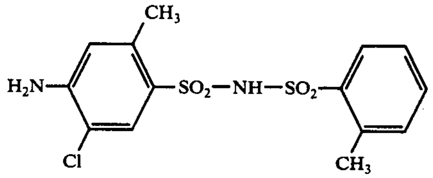 |
| 88 | " | 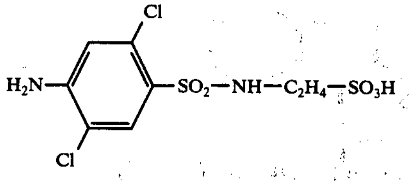 |
| 89 | " | 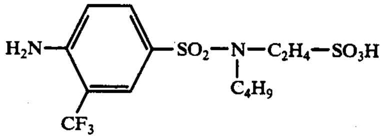 |
| 90 | 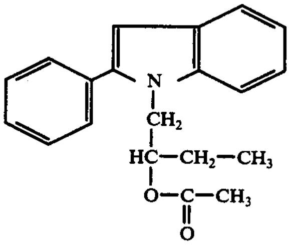 | 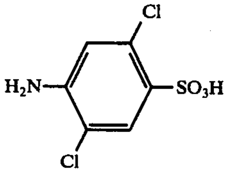 |
| 91 | " | 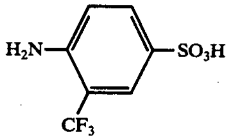 |
| 92 | " | 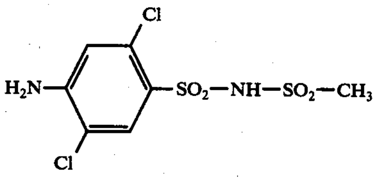 |
| 93 | " | 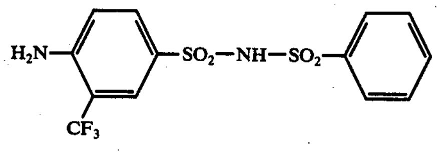 |
| 94 | " | 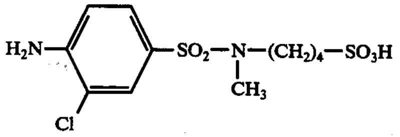 |
| 95 | " | 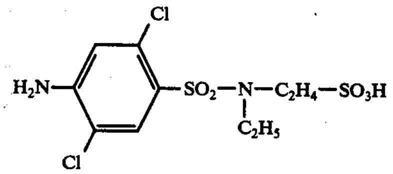 |

-continued
| Example | Coupling component | Diazo component |
|---|---|---|
| 96 | ″ | 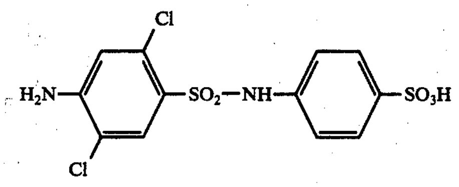 |
| 97 | 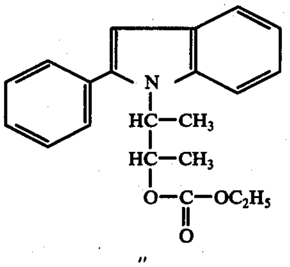 | 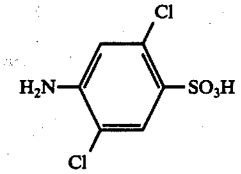 |
| 98 | ″ | 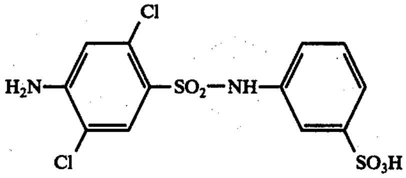 |
| 99 | ″ | 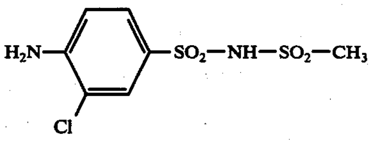 |
| 100 | ″ | 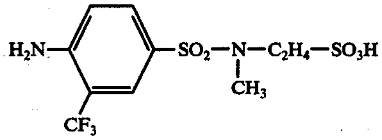 |
| 101 | 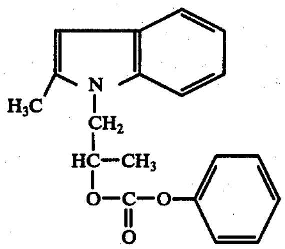 | 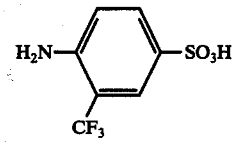 |
| 102 | ″ | 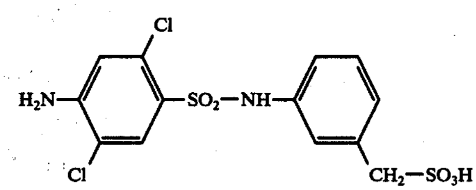 |
| 103 | ″ | 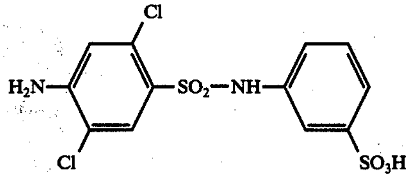 |
| 104 | ″ | 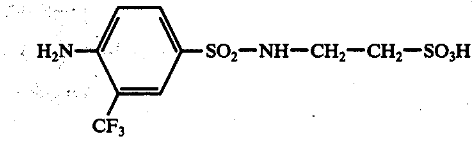 |

-continued
| Example | Coupling component | Diazo component |
|---|---|---|
| 105 | " | 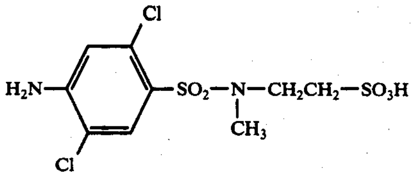 |
| 106 | " | 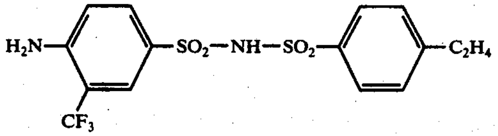 |
| 107 | " | 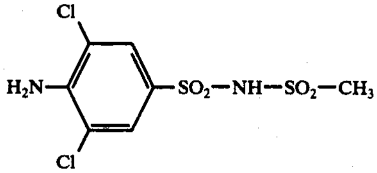 |
| 108 | 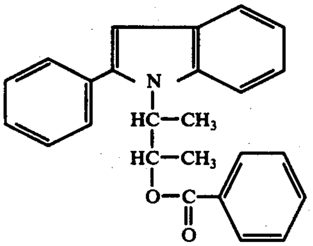 | 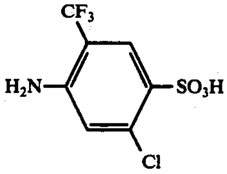 |
| 109 | " | 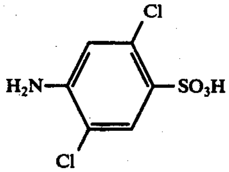 |
| 110 | " | 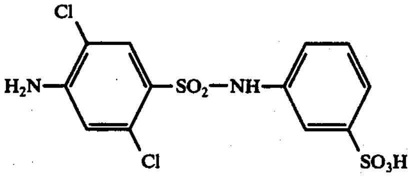 |
| 111 | " | 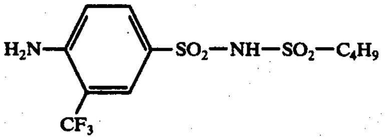 |
| 112 | " | 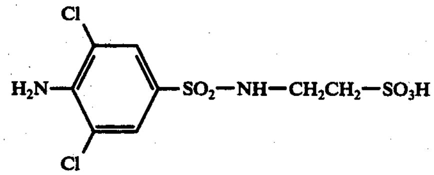 |
| 113 | " | 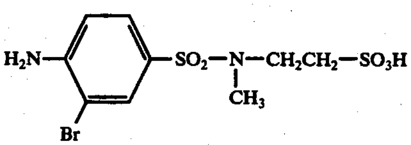 |
| 114 | " | 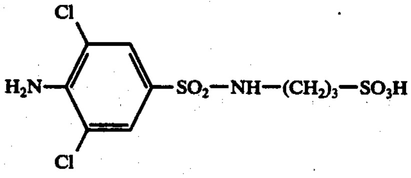 |

-continued
| Example | Coupling component | Diazo component |
|---|---|---|
| 115 | 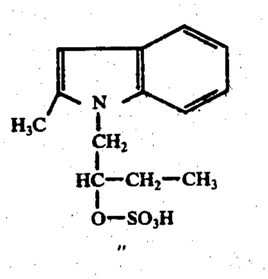 | 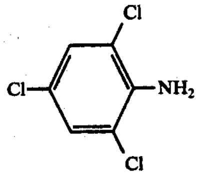 |
| 116 | " | 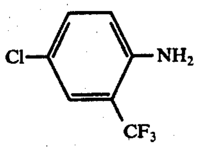 |
| 117 | " | 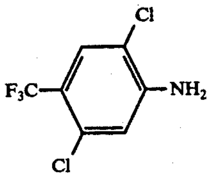 |
| 118 | " | 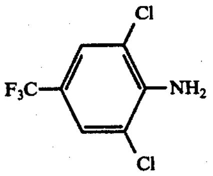 |
| 119 | " | 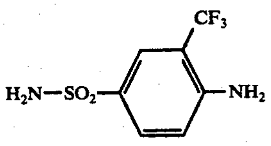 |
| 120 | " | 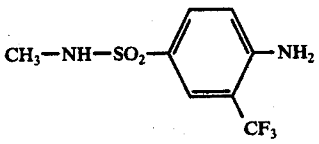 |
| 121 | " | 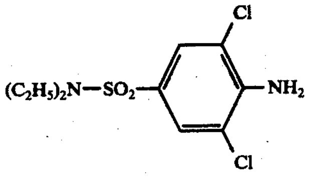 |
| 122 | " | 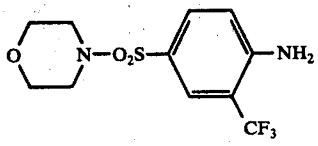 |
| 123 | " | 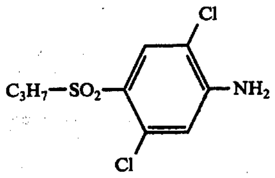 |
| 124 | " | 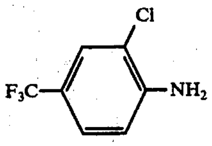 |

-continued
| Example | Coupling component | Diazo component |
|---|---|---|
| 125 | ″ | 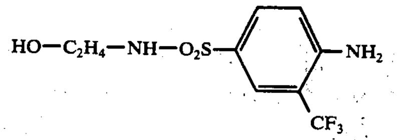 |
| 126 | 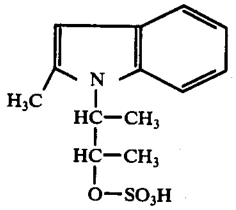 | 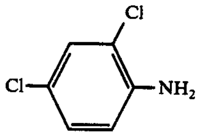 |
| 127 | ″ | 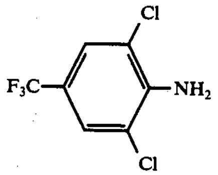 |
| 128 | ″ | 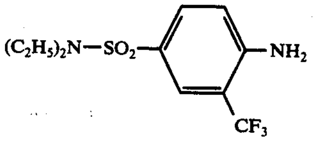 |
| 129 | ″ | 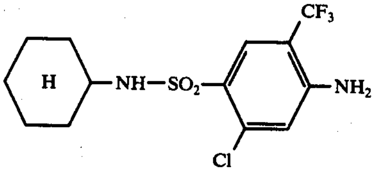 |
| 130 | ″ | 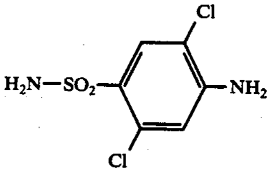 |
| 131 | ″ | 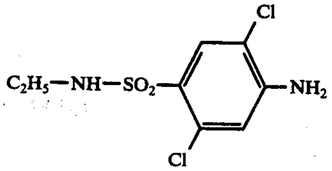 |
| 132 | ″ | 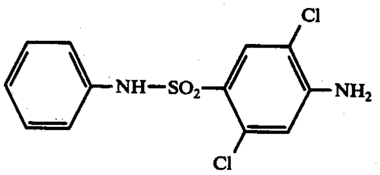 |
| 133 | ″ | 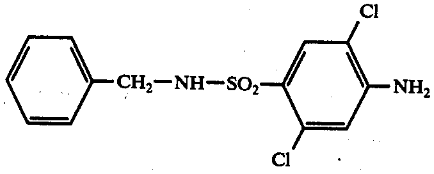 |
| 134 | ″ | 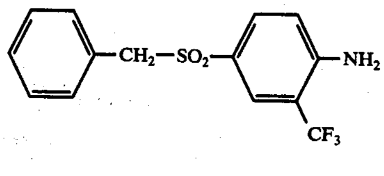 |

-continued
| Example | Coupling component | Diazo component |
|---|---|---|
| 135 | " | 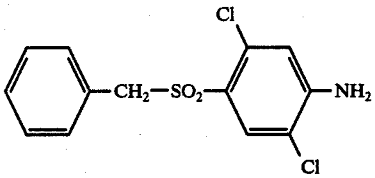 |
| 136 | " | 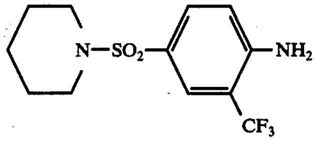 |
| 137 | " | 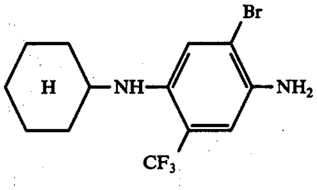 |
| 138 | " | 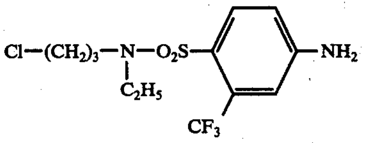 |
| 139 | 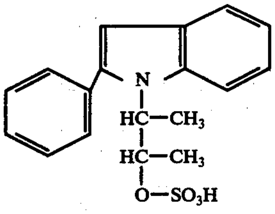 | 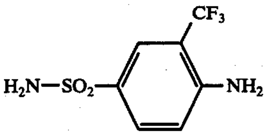 |
| 140 | " | 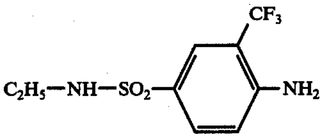 |
| 141 | " | 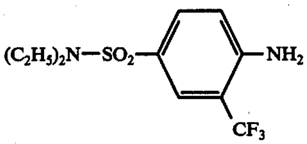 |
| 142 | " | 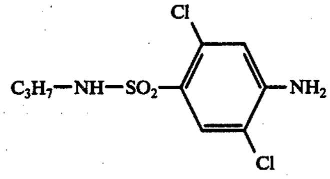 |
| 143 | " | 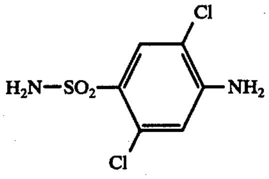 |
| 144 | " | 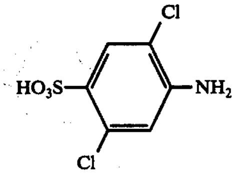 |

-continued
| Example | Coupling component | Diazo component |
|---|---|---|
| 145 | " | 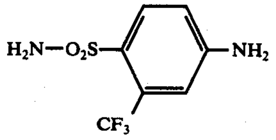 |
| 146 | " | 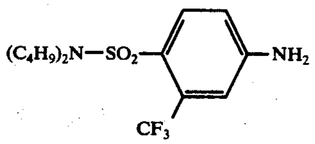 |
| 147 | " | 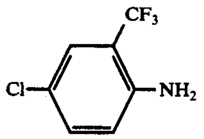 |
| 148 | 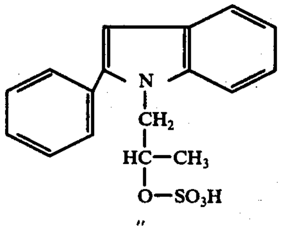 | 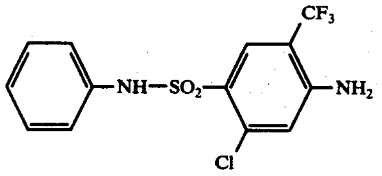 |
| 149 | " | 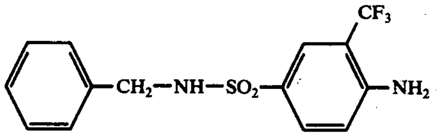 |
| 150 | " | 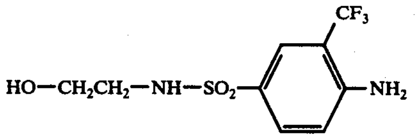 |
| 151 | " | 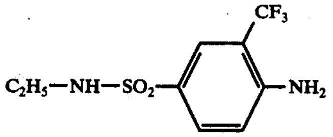 |
| 152 | " | 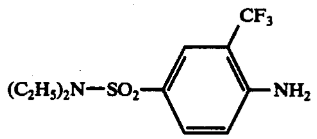 |
| 153 | " | 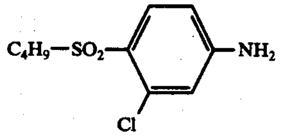 |
| 154 | " | 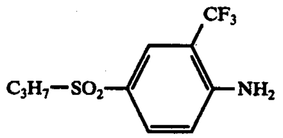 |
| 155 | " | 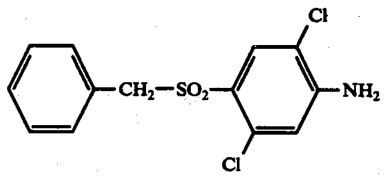 |

-continued
| Example | Coupling component | Diazo component |
|---|---|---|
| 156 | " | 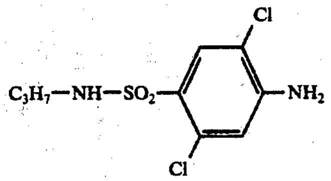 |
| 157 | " | 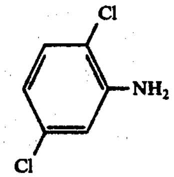 |
| 158 | 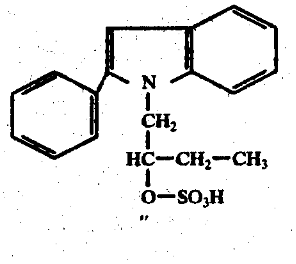 | 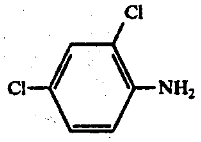 |
| 159 | " | 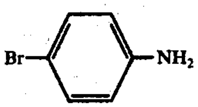 |
| 160 | " | 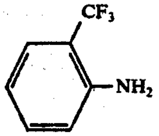 |
| 161 | " | 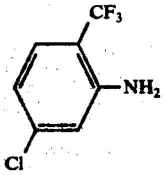 |
| 162 | " | 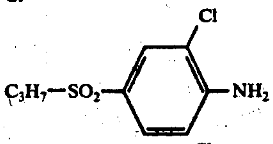 |
| 163 | " | 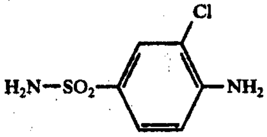 |
| 164 | " | 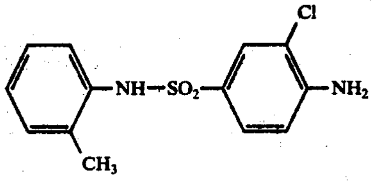 |
| 165 | " | 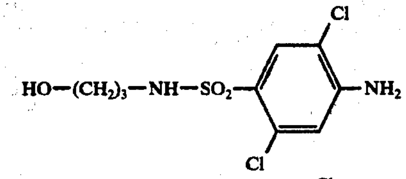 |
| 166 | " | 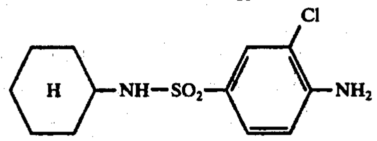 |

-continued
| Example | Coupling component | Diazo component |
|---|---|---|
| 167 | " | 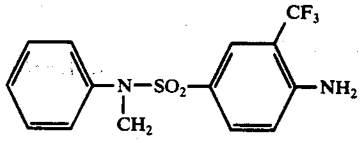 |
| 168 | " | 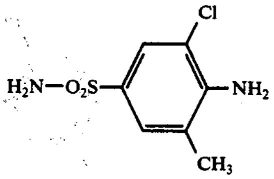 |
| 169 | 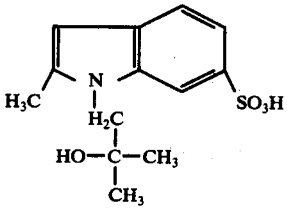 | 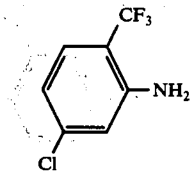 |
| 170 | " | 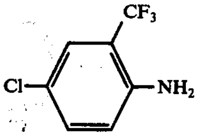 |
| 171 | " | 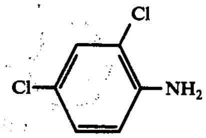 |
| 172 | " | 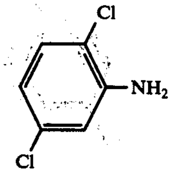 |
| 173 | 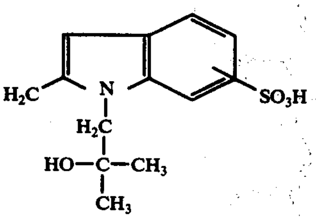 | 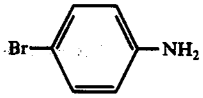 |
| 174 | " | 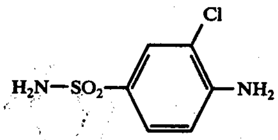 |
| 175 | 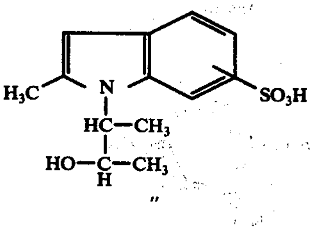 | 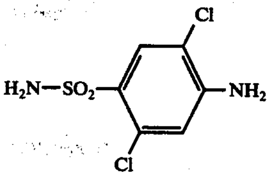 |
| 176 | " | 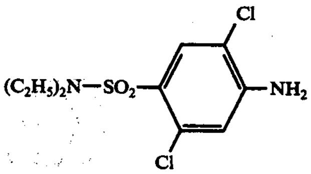 |

-continued
| Example | Coupling component | Diazo component |
|---|---|---|
| 177 | " | 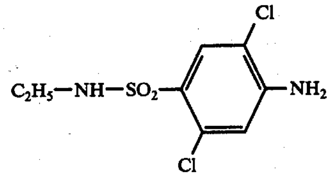 |
| 178 | " | 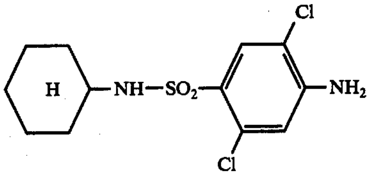 |
| 179 | " | 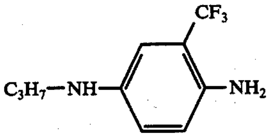 |
| 180 | 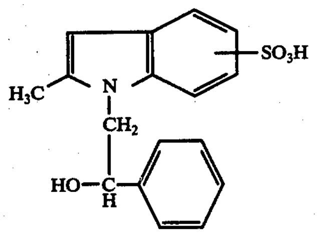 | 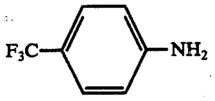 |
| 181 | " | 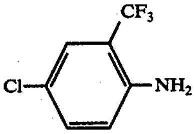 |
| 182 | " | 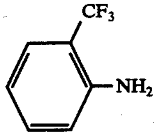 |
| 183 | " | 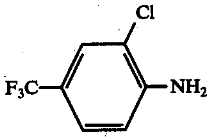 |
| 184 | " | 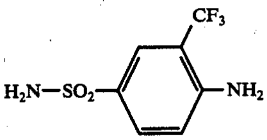 |
| 185 | " | 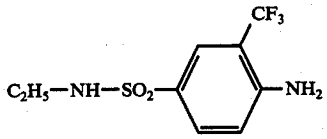 |
| 186 | " | 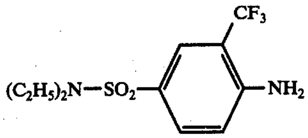 |
| 187 | " | 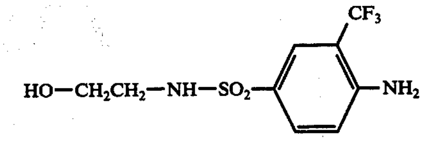 |

-continued
| Example | Coupling component | Diazo component |
|---|---|---|
| 188 | 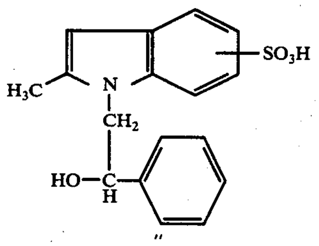 | 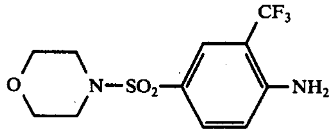 |
| 189 | " | 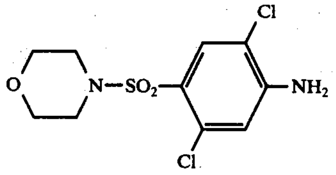 |
| 190 | 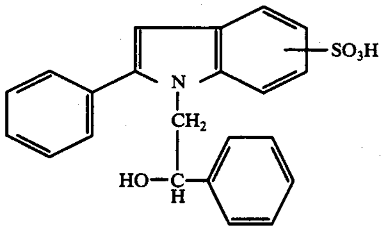 | 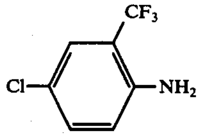 |
| 191 | " | 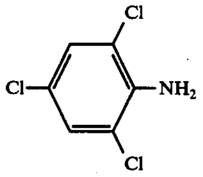 |
| 192 | " | 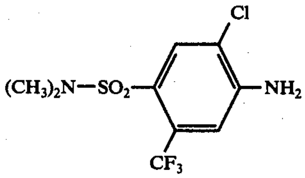 |
| 193 | " | 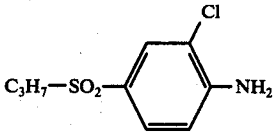 |
| 194 | " | 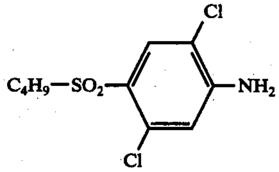 |
| 195 | 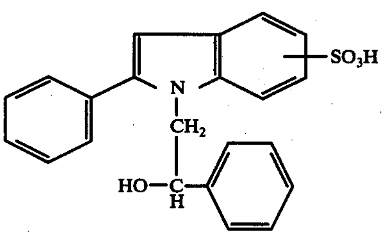 | 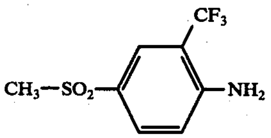 |
| 196 | " | 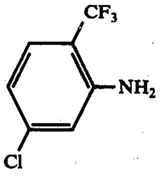 |

-continued
| Example | Coupling component | Diazo component |
|---|---|---|
| 197 | " | 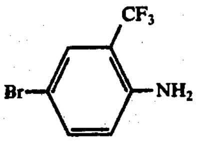 |
| 198 | " | 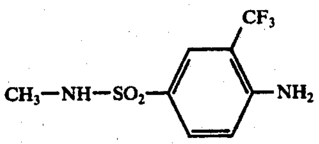 |
| 199 | 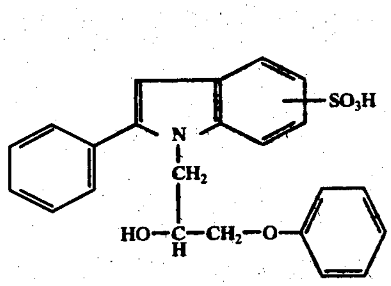 | 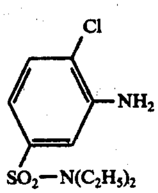 |
| 200 | " | 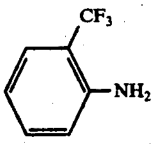 |
| 201 | " | 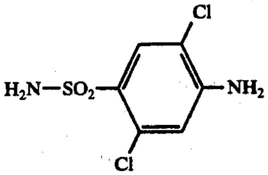 |
| 202 | 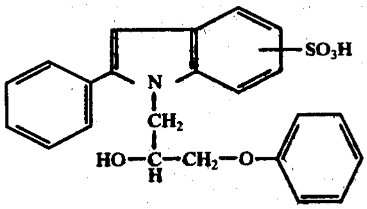 | 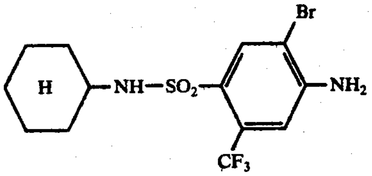 |
| 203 | " | 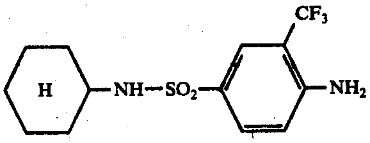 |
| 204 | " | 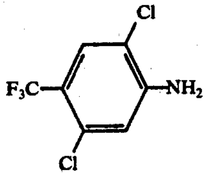 |
| 205 | " | 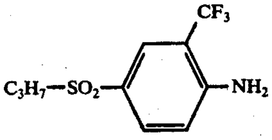 |
| 206 | " | 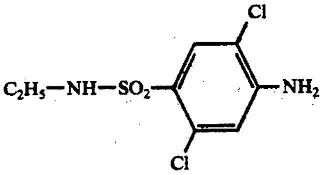 |

-continued
| Example | Coupling component | Diazo component |
|---|---|---|
| 207 | 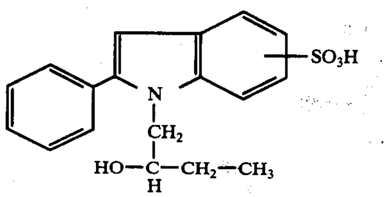 | 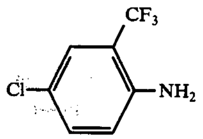 |
| 208 | " | 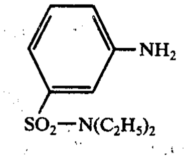 |
| 209 | 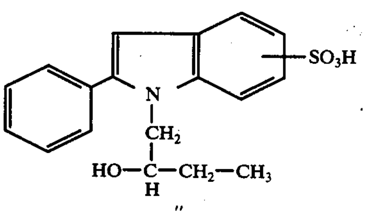 | 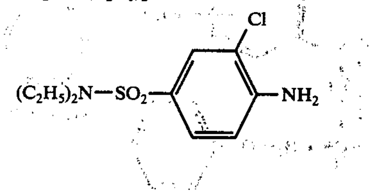 |
| 210 | " | 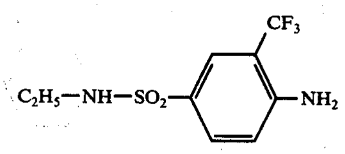 |
| 211 | 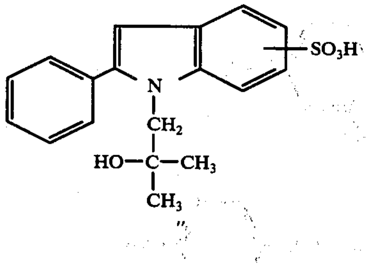 | 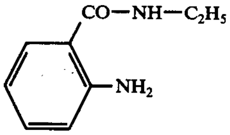 |
| 212 | " | 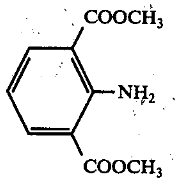 |
| 213 | " | 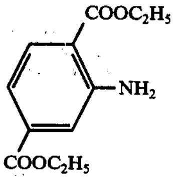 |
| 214 | " | 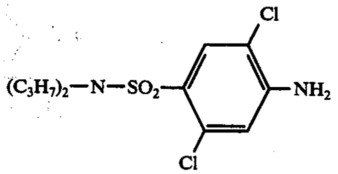 |
| 215 | 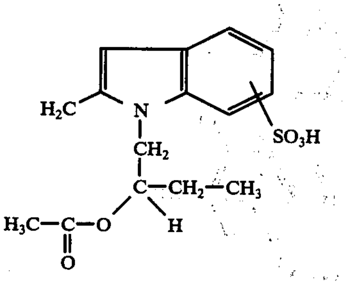 | 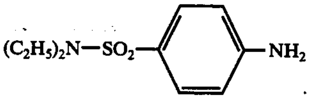 |

-continued
| Example | Coupling component | Diazo component |
|---|---|---|
| 216 | " | 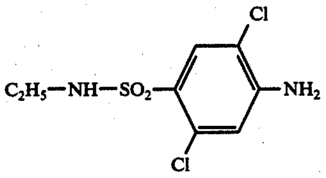 |
| 217 | " | 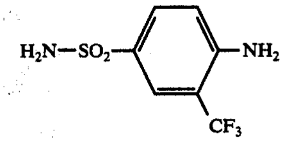 |
| 218 | " | 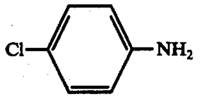 |
| 219 | 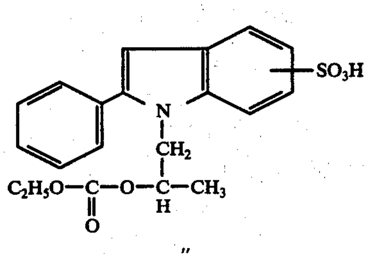 | 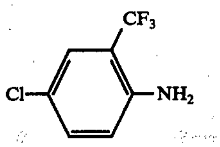 |
| 220 | " | 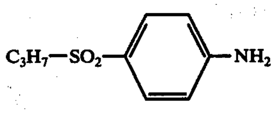 |
| | " | 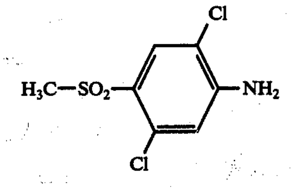 |
| 221 | 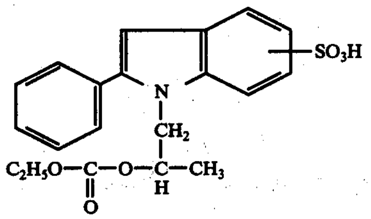 | 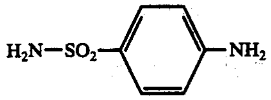 |
| 222 | 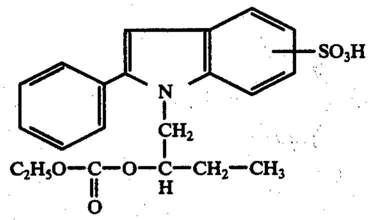 | 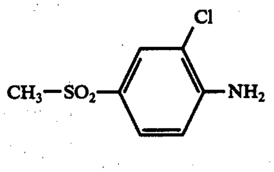 |
| 223 | " | 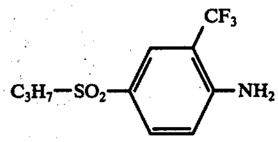 |
| 224 | " | 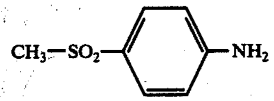 |

-continued
| Example | Coupling component | Diazo component |
|---|---|---|
| 225 | " | 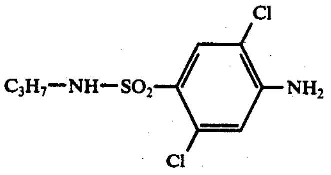 |
| 226 | " | 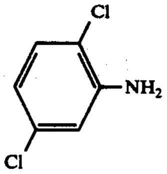 |
| 227 | " | 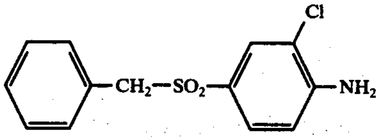 |
| 228 | 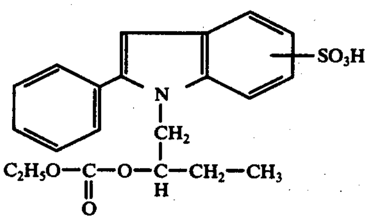 | 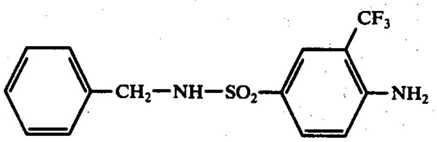 |
| 229 | " | 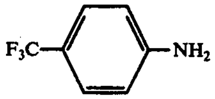 |
| 230 | 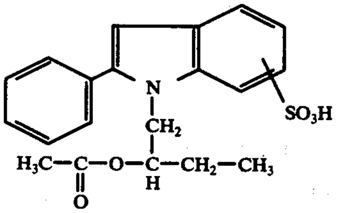 | 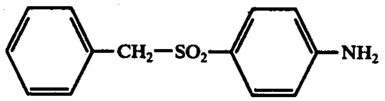 |
| 231 | " | 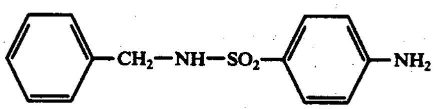 |
| 232 | " | 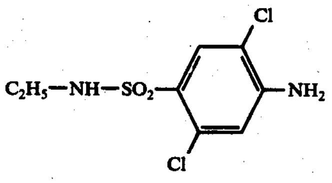 |
| 232 | " | 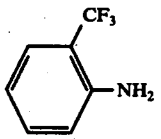 |
| 233 | " | 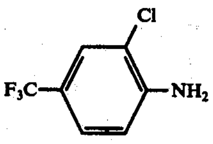 |

-continued
| Example | Coupling component | Diazo component |
|---|---|---|
| 234 | 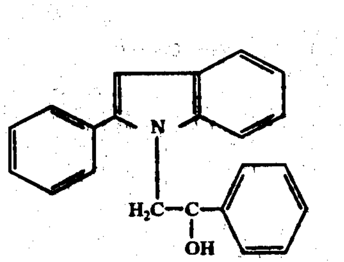 | 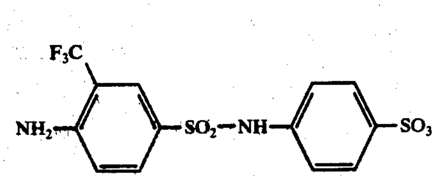 |
| 235 | " | 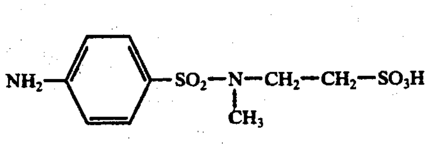 |
| 236 | 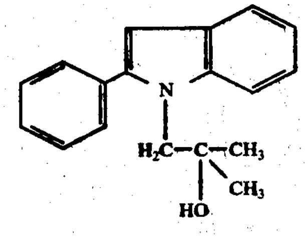 | 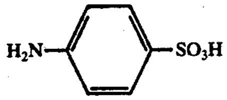 |
| | | 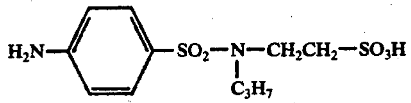 |
| 237 | 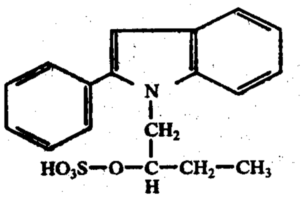 | 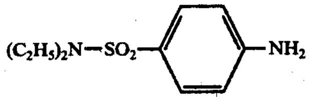 |
| 238 | " | 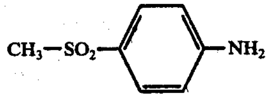 |
| 239 | " | 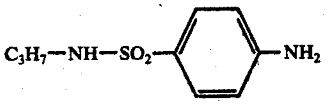 |
| 240 | 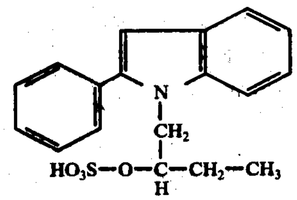 | 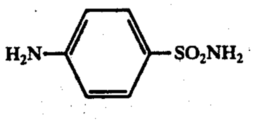 |
| 241 | 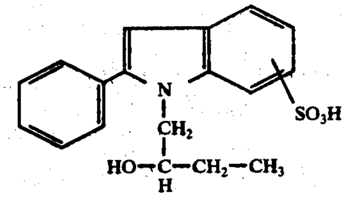 | 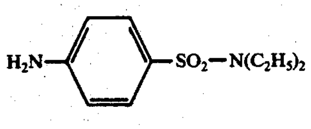 |
| 242 | " | 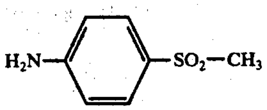 |

-continued

| Example | Coupling component | Diazo component |
|---|---|---|
| 243 | 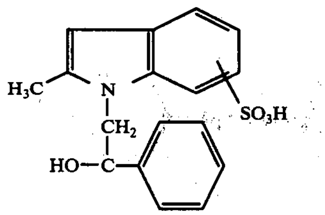 | 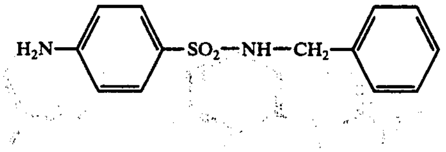 |
| 244 | 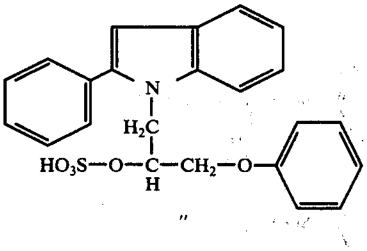 | 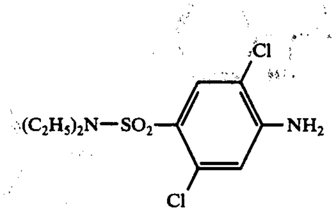 |
| 245 | " | 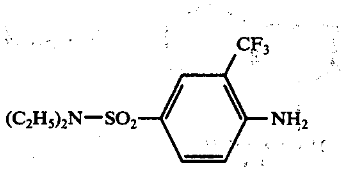 |
| 246 | 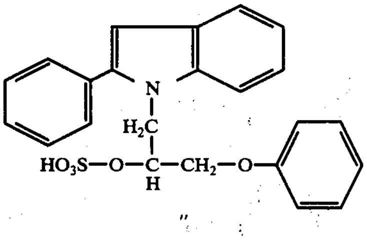 | 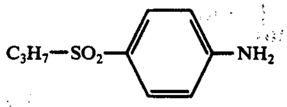 |
| 247 | " | 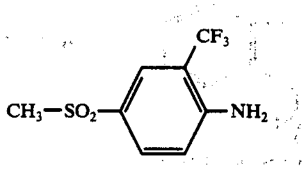 |
| 248 | " | 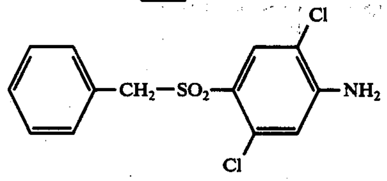 |
| 249 | " | 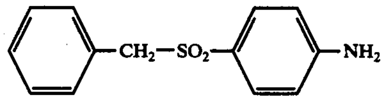 |

EXAMPLE 250

3.51 g of 2,5-dichloro-4-amino-benzenesulphonic acid are dissolved in 30 ml of water by means of 0.8 g of sodium hydroxide solution. 1 g of sodium nitrite is then also dissolved in the mixture. The solution thus obtained is added dropwise to 100 g of ice and 10 ml of concentrated hydrochloric acid. The mixture is stirred for a further 2 hours at 0° C. the excess nitrite is destroyed with amidosulphonic acid and a solution of 3.04 g of a mixture of about 70% of 1-(2-hydroxybutyl)-2-methylindole and about 30% of 1-(1-hydroxymethyl-propyl)-2-methylindole in 75 ml of glacial acetic acid is then added dropwise. After completion of coupling the dyestuff, of which the components, in the form of the free acids correspond to the formulae

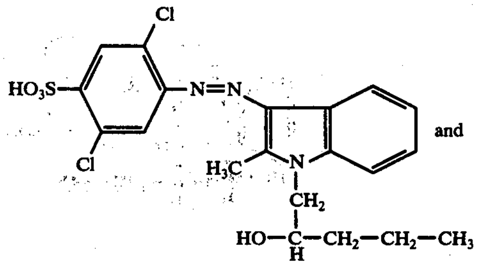

and

-continued

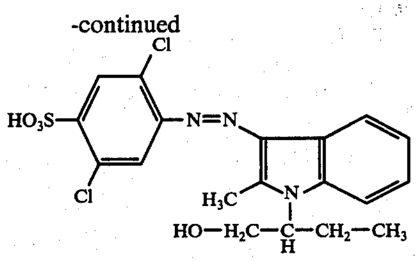

is isolated by filtration, washed with water and dried in vacuo at 40° to 50° C.

We claim:

1. Monoazo dyestuff which in the form of the free acid corresponds to the formula

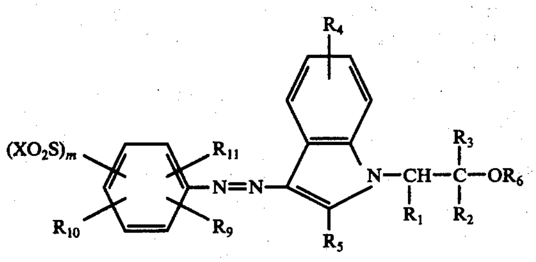

wherein

X represents OH, NH—$SO_2$—$R_7$,

—N($R_8$)—$C_2$—$C_4$—alkylene—$OSO_3H$,

—N($R_8$)—$C_2$—$C_4$—alkylene—$SO_3H$,

—N($R_8$)—phenylene—$SO_3H$, —N($R_8$)—phenylene—$CH_2$—$SO_3H$ or —N($R_8$)—phenylene—$SO_2$—NH—$SO_2$—$R_7$;

wherein any of said phenylene radicals is unsubstituted or substituted by $C_1$-$C_4$-alkyl, $C_1$-$C_4$-alkoxy, benzyloxy, chloro, bromo, cyano, or nitro;

$R_1$ and $R_2$ represent H; $C_1$-$C_4$-alkyl; $C_1$-$C_4$-alkyl substituted by $C_1$-$C_4$-alkoxy, cyclohexyloxy, benzyloxy, phenoxy, cyano, fluoro, chloro, bromo, OH or $C_1$-$C_4$-alkylcarbonyloxy; phenyl; naphthyl; phenyl or naphthyl substituted by phenyl, $C_1$-$C_4$-alkyl, fluoro, chloro, bromo, nitro, or $C_1$-$C_4$-alkoxy; benzyl; 2-phenylethyl; benzyl or 2-phenylethyl substituted by $C_1$-$C_4$-alkyl, $C_1$-$C_4$-alkoxy, fluoro, chloro, bromo or cyano; cyclopentyl; cyclohexyl; or carbo-$C_1$-$C_4$-alkoxy; provided that at least one of $R_1$ or $R_2$ must be hydrogen;

$R_3$ represents H or $C_1$-$C_4$-alkyl, $R_4$ represents hydrogen; fluoro; chloro; bromo; cyano; sulpho; $C_1$-$C_4$-alkyl; $C_1$-$C_4$-alkoxy; $C_1$-$C_4$-alkoxy substituted by OH, fluoro, chloro, bromo, or cyano;

$R_5$ represents $C_1$-$C_4$-alkyl; phenyl; naphthyl; phenyl or naphthyl substituted by phenyl, $C_1$-$C_4$-alkyl, fluoro, chloro, bromo, nitro, or $C_1$-$C_4$-alkoxy;

$R_6$ represents hydrogen; $C_2$-$C_4$-alkylcarbonyl; $C_1$-$C_4$-alkoxycarbonyl; sulpho; $C_1$-$C_4$-alkylsulphonyl; $C_1$-$C_4$-akylaminocarbonyl; phenylcarbonyl; phenyloxycarbonyl; phenylsulphonyl; or phenylaminocarbonyl; wherein any of the said phenyl radicals may be substituted by $C_1$-$C_4$-alkyl, fluoro, chloro, bromo, or $C_1$-$C_4$-alkoxy;

$R_7$ represents $C_1$-$C_4$-alkyl; di-$C_1$-$C_4$-alkylamino, phenyl; naphthyl; phenyl or naphthyl substituted by $C_1$-$C_4$-alkyl, fluoro, chloro, bromo, nitro, or $C_1$-$C_4$-alkoxy;

$R_8$ represents hydrogen; $C_1$-$C_4$-alkyl; or $C_1$-$C_4$-alkyl substituted by fluoro, chloro, bromo, cyano, hydroxyl, or $C_1$-$C_4$-alkoxy;

$R_9$ and $R_{10}$ represent H, chloro; bromo; thiocyanato; cyano; nitro; $C_1$-$C_4$-alkyl; $C_1$-$C_4$-alkoxy; carbo-$C_1$-$C_4$-alkoxy; carbamoyl; sulphamoyl; hydroxyl; trifluoromethyl; $C_1$-$C_4$-alkylsulphonyl; phenylsulphonyl; or benzylsulphonyl;

$R_{11}$ represents hydrogen, chloro; bromo; $C_1$-$C_4$-alkyl; trifluoromethyl; $C_1$-$C_4$-alkylsulphonyl; phenylsulphonyl; benzylsulphonyl; carbamoyl; or sulphamoyl; wherein said carbamoyl and said sulphamoyl radicals in $R_9$, $R_{10}$, and $R_{11}$ are unsubstituted, mono- or disubstituted by $C_1$-$C_4$-alkyl; $C_1$-$C_4$-alkyl substituted by fluoro, chloro, bromo, cyano, hydroxyl, or $C_1$-$C_4$-alkoxy; phenyl; naphthyl; phenyl or naphthyl substituted by phenyl, $C_1$-$C_4$-alkyl, fluoro, chloro, bromo, nitro, or $C_1$-$C_4$-alkoxy; benzyl; 2-phenylethyl; or benzyl or 2-phenylethyl substituted by $C_1$-$C_4$-alkyl, $C_1$-$C_4$-alkoxy, fluoro, chloro, bromo, or cyano; and

*m* represents 0 or 1, with the proviso that the total number of acid groups per molecule is 1 or 2.

2. Monoazo dyestuff according to claim 1, which in the form of the free acid corresponds to the formula

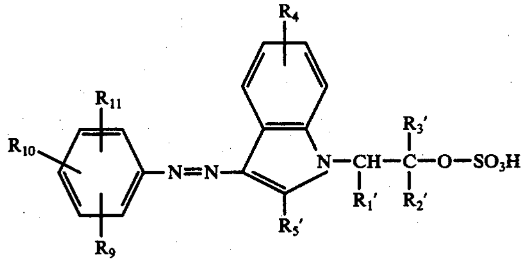

wherein $R_9$, $R_{10}$ and $R_{11}$ have the meaning indicated in claim 1, $R_1'$, $R_2'$ and $R_3'$ represent hydrogen or $C_1$-$C_4$-alkyl, but either $R_1'$ or $R_2'$ must be hydrogen, $R_4'$ represents hydrogen, chlorine, methyl, ethyl, methoxy or ethoxy and $R_5'$ represents unsubstituted $C_1$-$C_4$-alkyl or phenyl.

3. Monoazo dyestuff according to claim 1, which in the form of the free acid corresponds to the formula

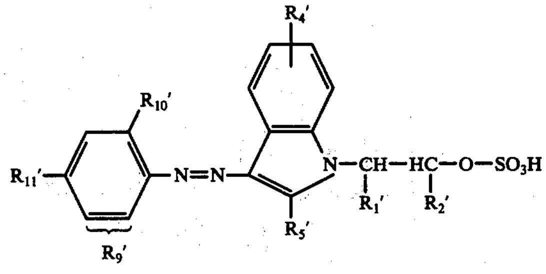

wherein $R_1'$, $R_2'$, $R_4'$ and $R_5'$ have the meaning mentioned in claim 3 and $R_9'$ and $R_{10}'$ represent hydrogen, methyl, chlorine, bromine, trifluoromethyl, sulphamoyl, unsubstituted $C_1$-$C_4$-alkylsulphonyl, benzylsulphonyl or phenylsulphonyl and $R_{11}'$ represents hydrogen, chlorine, bromine, trifluoromethyl, sulphamoyl, unsubstituted $C_1$–$C_4$-alkylsulphonyl, benzylsulphonyl or phenylsulphonyl.

4. Monoazo dyestuff according to claim 1, which in the form of the free acid corresponds to the formula

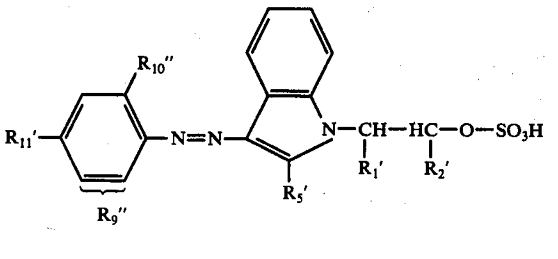

wherein $R_1'$, $R_2'$, $R_5'$ and $R_{11}'$ have the meaning indicated in claim 3 and $R_9''$ and represents hydrogen, chlorine, bromine or trifluoromethyl, sulphamoyl or $C_1$-$C_4$-alkylsulphonyl and $R_{10}''$ represents chlorine, bromine, methyl or trifluoromethyl.

5. Monoazo dyestuff according to claim 1, which in the form of the free acid corresponds to the formula

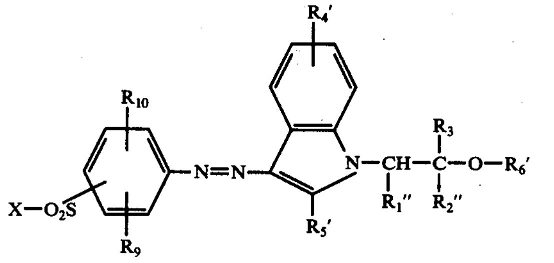

wherein $R_3$, $R_4'$, $R_5'$, $R_9$, $R_{10}$ and X have the meaning indicated in claim 3 and $R_1''$ and $R_2''$ represent hydrogen, optionally phenoxy-substituted $C_1$–$C_4$-alkyl, phenyl or o-, m- or p-tolyl, but either $R_1''$ or $R_2''$ must be hydrogen and $R_6'$ represents hydrogen, $C_2$–$C_4$-alkylcarbonyl, $C_1$–$C_4$-alkoxycarbonyl, phenylcarbonyl or phenoxycarbonyl.

6. Monoazo dyestuff according to claim 1, which in the form of the free acid corresponds to the formula

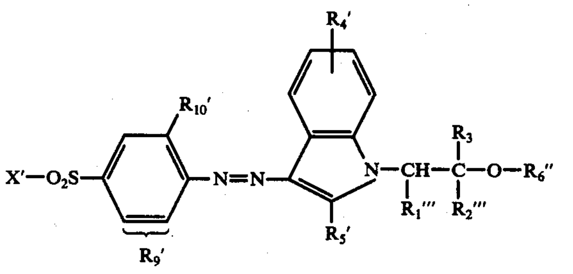

wherein $R_3$, $R_4'$, $R_5'$, $R_9'$ and $R_{10}'$ have the meaning indicated in claims 3 and X' represents OH, $-NH-SO_2-R_7'$, $-\underset{R_8'}{N}$-alkylene-O$-SO_3H$, $-\underset{R_8'}{N}$-alkylene-$SO_3H$ or $-\underset{R_8'}{N}$-phenylene-$SO_3H$ $R_1'''$ and $R_2'''$ represent hydrogen, optionally phenoxy-substituted $C_1$–$C_4$-alkyl or phenyl, but either $R_1'''$ or $R_2'''$ must be hydrogen, $R_6''$ represents hydrogen, $R_7'$ represents unsubstituted $C_1$–$C_4$-alkyl, phenyl substituted by methyl, ethyl, chlorine or bromine, or 1- or 2-naphthyl and $R_8'$ represents hydrogen or unsubstituted $C_1$–$C_4$-alkyl.

7. Monoazo dyestuff according to claim 1, which in the form of the free acid corresponds to the formula

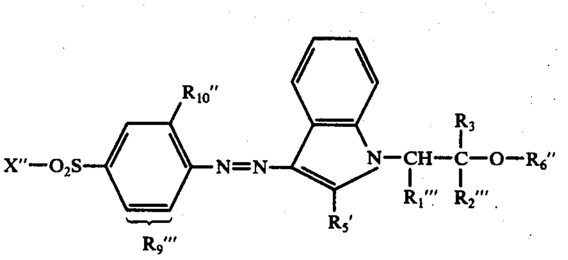

wherein $R_1'''$, $R_2'''$, $R_3$, $R_5'$, $R_6''$ and $R_{10}''$ have the meaning indicated in claim 7 and X'' represents OH, $-NH-SO_2-R_7''$, $-\underset{R_8''}{N}$-alkylene-O$-SO_3H$, $-\underset{R_8''}{N}$-alkylene-$SO_3H$ or $-\underset{R_8''}{N}$-phenylene-$SO_3H$, $R_7''$ represents unsubstituted $C_1$–$C_4$-alkyl, o-, m- or p-tolyl or o-, m- or p-chlorophenyl or bromophenyl, $R_8''$ represents hydrogen, methyl or ethyl and $R_9'''$ represents hydrogen, chlorine, bromine or trifluoromethyl.

8. Monoazo dyestuff according to claim 1, which in the form of the free acid corresponds to the formula

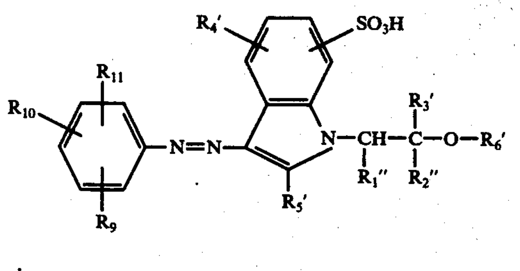

wherein $R_1''$, $R_2''$, $R_3'$, $R_4'$, $R_5'$, $R_6'$, $R_9$, $R_{10}$ and $R_{11}$ have the meaning indicated in claim 6.

9. Monoazo dyestuff according to claim 1, which in the form of the free acid corresponds to the formula

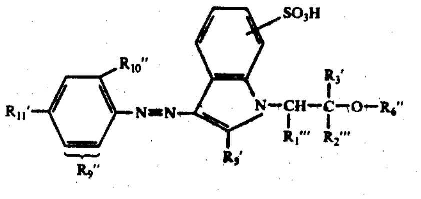

wherein $R_1'''$, $R_2'''$, $R_3'$, $R_5'$, $R_6''$, $R_9''$, $R_{10}''$ and $R_{11}'$ have the meaning indicated in the claim 9.

10. Monoazo dyestuff of claim 1 of the formula

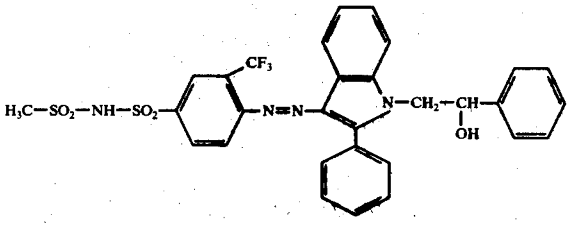

11. Monoazo dyestuff of claim 1 of the formula

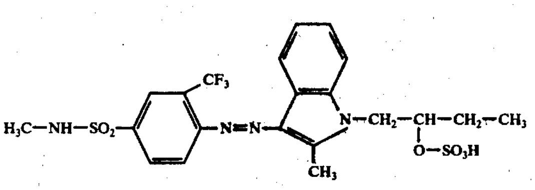

12. Monoazo dyestuff of claim 1 of the formula

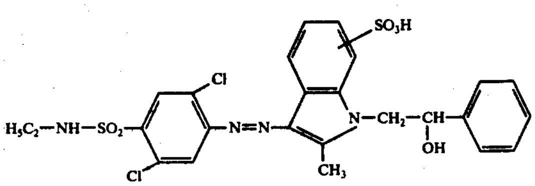

13. Monoazo dyestuff of claim 1 of the formula

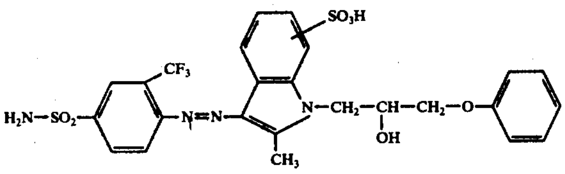

14. Monoazo dyestuff of claim 1 of the formula

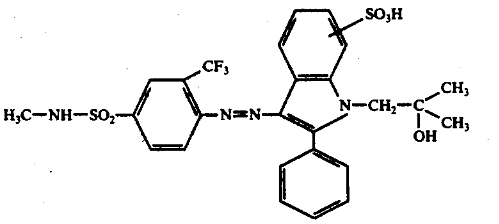

* * * * *